US008012363B2

(12) United States Patent
McAvoy et al.

(10) Patent No.: US 8,012,363 B2

(45) **Date of Patent: *Sep. 6, 2011**

(54) METAL FILM PROTECTION DURING PRINTHEAD FABRICATION WITH MINIMUM NUMBER OF MEMS PROCESSING STEPS

(75) Inventors: Gregory John McAvoy, Balmain (AU); Emma Rose Kerr, Balmain (AU); Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 891 days.

This patent is subject to a terminal disclaimer.

(21) Appl. No.: 11/946,840

(22) Filed: Nov. 29, 2007

(65) Prior Publication Data

US 2009/0139961 A1 Jun. 4, 2009

(51) Int. Cl.
*G01D 15/00* (2006.01)

(52) U.S. Cl. .................. 216/27; 216/2; 216/11; 216/56; 216/61; 347/47; 347/63; 347/64

(58) Field of Classification Search ................ 216/2, 11, 216/27, 56, 61; 347/47, 63, 64
See application file for complete search history.

(56) References Cited

U.S. PATENT DOCUMENTS 6,426,014 B1 * 7/2002 Silverbrook .................... 216/27
6,515,751 B1 * 2/2003 Craighead et al. ............ 356/519
7,600,856 B2 * 10/2009 Lebens et al. ................... 347/56
7,794,613 B2 * 9/2010 McAvoy et al. ................ 216/27
2003/0184616 A1 10/2003 Yang et al.
2003/0198899 A1 10/2003 Ohkuma
2003/0224560 A1 * 12/2003 Odaka et al. .................. 438/148
2004/0109043 A1 * 6/2004 Song et al. ...................... 347/63
2005/0243129 A1 11/2005 Kim
2007/0120889 A1 5/2007 Kang et al.
2008/0225077 A1 * 9/2008 McAvoy et al. ................ 347/20

FOREIGN PATENT DOCUMENTS

JP 09-267478 A 10/1997
JP 2003-063014 A 3/2003

* cited by examiner

*Primary Examiner* — Lan Vinh
*Assistant Examiner* — Christopher M Remavege

(57) ABSTRACT

A method of fabricating a printhead having a hydrophobic ink ejection face, the method comprising the steps of: (a) providing a partially-fabricated printhead comprising a plurality of nozzle chambers and a nozzle plate having relatively hydrophilic nozzle surface, the nozzle surface at least partially defining the ink ejection face of the printhead; (b) depositing a hydrophobic polymeric layer onto the nozzle surface; (c) depositing a protective metal film onto at least the polymeric layer; (d) depositing a sacrificial material onto the polymeric layer; (e) patterning the sacrificial material to define a plurality of nozzle opening regions; (f) defining a plurality of nozzle openings through the metal film, the polymeric layer and the nozzle plate; (g) subjecting the printhead to an oxidizing plasma; and (h) removing the protective metal film, thereby providing a printhead having a relatively hydrophobic ink ejection face.

19 Claims, 26 Drawing Sheets

METAL FILM PROTECTION DURING PRINTHEAD FABRICATION WITH MINIMUM NUMBER OF MEMS PROCESSING STEPS

FIELD OF THE INVENTION

The present invention relates to the field of printers and particularly inkjet printheads. It has been developed primarily to improve print quality and reliability in high resolution printheads.

CROSS REFERENCE TO OTHER RELATED APPLICATIONS

The following applications have been filed by the Applicant simultaneously with this application:

Ser. Nos. 11/946,839 11/946,838 11/946,837 The disclosures of these co-pending applications are incorporated herein by reference.

The following patents or patent applications filed by the applicant or assignee of the present invention are hereby incorporated by cross-reference.

| | | | | | | |
|---|---|---|---|---|---|---|
| 11/159,193 | 10/510,098 | 11/124,256 | 10/760,248 | 10/949,288 | 10/509,999 | 10/902,883 |
| 11/601,670 | 10/636,211 | 10/944,043 | 09/575,172 | 11/006,734 | 10/509,997 | 09/575,172 |
| 11/255,942 | 10/503,929 | 10/470,942 | 11/063,577 | 11/149,389 | 09/517,384 | 10/666,495 |
| 10/636,214 | 10/656,469 | 11/228,410 | 11/758,644 | 11/003,418 | 11/003,334 | 11/003,700 |
| 11/003,684 | 11/003,617 | 11/097,266 | 11/097,267 | 11/499,746 | 11/501,774 | 11/545,501 |
| 11/084,237 | 11/084,240 | 11/084,238 | 11/446,240 | 11/442,381 | 11/764,729 | 10/683,041 |
| 10/922,875 | 10/922,880 | 10/922,881 | 10/922,876 | 11/124,200 | 11/155,544 | 11/038,200 |
| 11/209,709 | 11/330,058 | 10/510,092 | 10/510,207 | 10/534,823 | 10/534,804 | 10/534,883 |
| 11/246,685 | 10/760,238 | 10/760,231 | 11/482,950 | 11/499,709 | 11/592,984 | 11/601,668 |
| 11/650,546 | 11/246,684 | 11/505,856 | 11/210,687 | 11/097,212 | 09/575,165 | 10/943,874 |
| 10/981,627 | 11/159,196 | 11/228,450 | 11/834,633 | 09/575,198 | 10/917,465 | 11/255,941 |
| 10/291,660 | 11/442,366 | 10/492,154 | 11/513,077 | 10/974,881 | 11/102,842 | 11/155,513 |
| 11/488,066 | 11/066,160 | 10/934,490 | 10/727,163 | 10/727,257 | 11/488,841 | 10/854,521 |
| 10/854,504 | 10/854,497 | 10/854,489 | 11/499,803 | 10/943,907 | 11/225,154 | 10/760,196 |
| 10/760,275 | 10/760,184 | 10/760,186 | 10/760,261 | 11/501,771 | 11/650,554 | 11/014,748 |
| 11/014,761 | 11/014,714 | 11/014,724 | 11/014,739 | 11/014,726 | 11/014,745 | 11/014,712 |
| 11/014,751 | 11/014,743 | 11/014,754 | 11/014,741 | 11/014,767 | 11/014,742 | 11/014,722 |
| 11/642,520 | 10/962,523 | 11/223,022 | 11/013,636 | 11/064,008 | 11/064,013 | 11/478,592 |
| 11/488,867 | 11/601,762 | 11/650,553 | 10/485,805 | 10/510,154 | 10/510,000 | 11/176,158 |
| 11/442,161 | 11/442,126 | 11/505,848 | 11/008,115 | 11/011,120 | 11/012,329 | 11/124,348 |
| 11/209,712 | 11/329,155 | 10/636,274 | 11/478,735 | 11/525,863 | 11/585,964 | 11/764,746 |
| 10/965,737 | 11/202,343 | 11/225,156 | 11/228,433 | 11/272,425 | 11/442,160 | 10/804,048 |
| 10/846,561 | 10/846,647 | 11/144,812 | 11/520,575 | 11/546,437 | 11/592,207 | 09/575,165 |
| 09/575,198 | 11/329,039 | 11/329,040 | 11/442,189 | 11/483,061 | 11/503,078 | 11/520,735 |
| 11/505,858 | 11/525,850 | 11/583,870 | 11/592,983 | 11/592,208 | 11/601,828 | 11/635,482 |
| 11/635,526 | 11/650,545 | 11/653,241 | 11/653,240 | 11/706,300 | 11/740,265 | 11/737,720 |
| 11/739,056 | 11/740,204 | 11/740,223 | 11/753,557 | 11/750,285 | 11/778,559 | 11/838,878 |
| 11/845,669 | 10/503,928 | 10/920,283 | 10/919,249 | 11/045,442 | 11/248,423 | 11/248,422 |
| 11/282,769 | 11/330,060 | 11/442,111 | 11/499,806 | 11/499,710 | 11/749,156 | 11/854,435 |
| 11/853,817 | 10/636,263 | 10/940,653 | 10/942,858 | 11/706,329 | 11/757,385 | 11/758,642 |
| 11/239,232 | 11/107,942 | 11/190,902 | 11/209,711 | 11/478,585 | 11/525,862 | 11/583,875 |
| 11/599,336 | 11/744,183 | 11/758,646 | 11/778,561 | 11/839,532 | 11/838,874 | 11/853,021 |
| 11/868,531 | 10/636,225 | 10/636,223 | 10/729,098 | 10/729,159 | 10/804,042 | 10/831,235 |
| 10/853,681 | 11/501,772 | 11/503,084 | 11/513,073 | 11/706,379 | 11/730,386 | 11/730,784 |
| 11/753,568 | 11/782,591 | 11/859,783 | 11/281,679 | 11/748,482 | 11/778,563 | 11/779,851 |
| 11/778,574 | 11/853,816 | 11/853,814 | 11/853,786 | 11/856,694 | 11/764,760 | 11/853,777 |
| 11/293,800 | 11/293,802 | 11/293,801 | 11/293,808 | 11/293,809 | 11/482,975 | 11/482,970 |
| 11/482,968 | 11/482,972 | 11/482,971 | 11/482,969 | 11/501,775 | 11/744,210 | 11/859,784 |
| 11/685,084 | 11/685,086 | 11/740,925 | 11/763,444 | 11/763,443 | 11/525,858 | 11/599,335 |
| 11/706,380 | 11/736,545 | 11/736,554 | 11/739,047 | 11/749,159 | 11/739,073 | 11/775,160 |
| 11/853,755 | 10/983,060 | 11/739,071 | 11/518,238 | 11/518,280 | 11/518,244 | 11/518,243 |
| 11/518,242 | 11/357,296 | 11/357,298 | 11/357,297 | 11/246,678 | 11/246,679 | 11/246,680 |
| 11/246,681 | 11/246,714 | 11/246,713 | 11/246,689 | 11/246,669 | 11/246,704 | 11/246,710 |
| 11/246,688 | 11/246,716 | 11/246,715 | 11/246,707 | 11/246,706 | 11/246,705 | 11/246,708 |
| 11/246,693 | 11/246,692 | 11/246,696 | 11/246,695 | 11/246,694 | 11/482,958 | 11/482,955 |
| 11/482,962 | 11/482,963 | 11/482,956 | 11/482,954 | 11/482,974 | 11/482,957 | 11/482,987 |
| 11/482,959 | 11/482,960 | 11/482,961 | 11/482,964 | 11/482,965 | 11/482,976 | 11/482,973 |
| 11/495,815 | 11/495,816 | 11/495,817 | 10/803,074 | 10/803,073 | 10/803,076 | 10/803,077 |
| 10/803,079 | 10/922,971 | 10/922,970 | 10/922,836 | 10/922,842 | 10/922,848 | 11/753,559 |
| 10/815,621 | 10/815,638 | 10/815,642 | 10/815,618 | 11/738,974 | 10/815,635 | 10/815,634 |
| 10/815,617 | 10/815,613 | 10/815,614 | 11/488,162 | 11/488,163 | 11/488,164 | 11/488,167 |
| 11/488,168 | 11/488,165 | 11/488,166 | 10/815,636 | 11/041,652 | 11/863,253 | 11/863,255 |
| 11/863,257 | 11/863,258 | 11/863,262 | 11/041,609 | 11/041,626 | 11/041,627 | 11/041,624 |
| 11/041,625 | 11/863,268 | 11/863,269 | 11/863,270 | 11/863,273 | 76/584,733 | 11/041,556 |
| 11/041,580 | 11/041,723 | 11/041,698 | 11/041,648 | 11/863,263 | 11/863,264 | 11/863,265 |
| 11/863,266 | 11/863,267 | 10/815,609 | 10/815,610 | 11/764,694 | 11/607,976 | 11/607,975 |
| 11/607,999 | 11/607,980 | 11/607,979 | 11/607,978 | 11/735,961 | 11/685,074 | 11/696,126 |
| 11/763,446 | 11/635,523 | 11/124,231 | 11/281,445 | 11/524,911 | 11/640,267 | 11/737,142 |
| 11/834,637 | 11/853,019 | 11/863,239 | 11/305,274 | 11/305,273 | 11/305,275 | 11/305,152 |
| 11/305,008 | 11/102,845 | 11/102,861 | 11/248,421 | 11/672,878 | 10/815,628 | 11,845,672 |
| 11/172,815 | 11/172,814 | 11/482,990 | 11/482,986 | 11/482,985 | 11/454,899 | 11/583,942 |
| 11/592,990 | 11/831,961 | 11/831,962 | 11/831,963 | 60/951,700 | 11/832,629 | 11/832,637 |
| 60/971,535 | 11/482,980 | 11/563,684 | 11/482,967 | 11/482,966 | 11/482,988 | 11/482,989 |
| 11/293,832 | 11/293,838 | 11/293,825 | 11/293,841 | 11/293,799 | 11/293,798 | 11/124,158 |
| 11/124,196 | 11/124,162 | 11/124,154 | 11/124,174 | 11/124,181 | 11/124,161 | 11/124,156 |

-continued

| | | | | | | |
|---|---|---|---|---|---|---|
| 11/124,176 | 11/124,187 | 11/124,180 | 11/124,193 | 11/124,183 | 11/124,178 | 11/124,179 |
| 11/124,169 | 11/187,976 | 11/188,011 | 11/188,014 | 11/482,979 | 11/853,018 | 11/228,540 |
| 11/228,501 | 11/228,530 | 11/228,490 | 11/228,531 | 11/228,533 | 11/228,502 | 11/228,507 |
| 11/228,482 | 11/228,505 | 11/228,497 | 11/228,487 | 11/228,529 | 11/228,484 | 11/228,489 |
| 11/228,518 | 11/228,536 | 11/228,496 | 11/228,488 | 11/228,506 | 11/228,526 | 11/228,539 |
| 11/228,538 | 11/228,524 | 11/228,523 | 11/228,519 | 11/228,528 | 11/228,527 | 11/228,525 |
| 11/228,520 | 11/228,498 | 11/228,511 | 11/228,522 | 111/228,515 | 11/228,537 | 11/228,534 |
| 11/228,491 | 11/228,499 | 11/228,509 | 11/228,492 | 11/228,493 | 11/228,510 | 11/228,508 |
| 11/228,512 | 11/228,514 | 11/228,494 | 11/228,495 | 11/228,486 | 11/228,521 | 11/228,517 |
| 11/228,513 | 11/228,503 | 11/228,535 | 11/228,478 | 11/228,479 | 11/772,240 | 11/863,246 |
| 11/863,145 | 11/865,650 | 11/198,235 | 11/861,282 | 11/861,284 | 11/766,052 | 11/592,996 |
| 11/329,163 | 11/450,431 | 11/482,951 | 11/545,566 | 11/583,826 | 11/604,315 | 11/706,950 |
| 11/730,399 | 11/749,121 | 11/753,549 | 11/834,630 | 019936/0467 | 11/474,281 | 11/485,258 |
| 11/706,304 | 11/706,324 | 11/706,326 | 11/706,321 | 11/772,239 | 11/782,598 | 11/829,941 |
| 019804/0802 | 11/852,986 | 11/763,440 | 11/763,442 | 11/246,687 | 11/246,718 | 11/246,686 |
| 11/246,703 | 11/246,711 | 11/246,712 | 11/246,717 | 11/246,709 | 11/246,700 | 11/246,701 |
| 11/246,697 | 11/246,698 | 11/246,699 | 11/246,675 | 11/246,674 | 11/246,667 | 11/829,957 |
| 11/829,960 | 11/829,961 | 11/829,962 | 11/829,963 | 11/829,966 | 11/829,967 | 11/829,968 |
| 11/829,969 | 11/446,227 | 11/472,345 | 11/474,273 | 11/474,279 | 11/482,939 | 11/603,824 |
| 11/601,672 | 11/653,253 | 11/706,328 | 11/706,299 | 11/737,080 | 11/737,041 | 11/778,062 |
| 11/778,566 | 11/782,593 | 11/246,673 | 11/246,683 | 11/246,682 | 60/939,086 | 11/860,538 |
| 11/860,539 | 11/860,540 | 11/860,541 | 11/860,542 | 11/298,774 | 11/329,157 | 11/490,041 |
| 11/501,767 | 11/505,846 | 11/505,857 | 11/524,908 | 11/524,938 | 11/524,912 | 11/592,995 |
| 11/649,773 | 11/650,549 | 11/653,237 | 11/706,378 | 11/706,962 | 11/749,118 | 11/754,937 |
| 11/749,120 | 11/744,885 | 11/779,850 | 11/765,439 | 11/842,950 | 11/839,539 | 11/764,806 |
| 11/782,595 | 11/482,953 | 11/482,977 | 11/544,779 | 11/756,625 | 11/756,626 | 11/756,628 |
| 11/756,629 | 11/756,630 | 11/756,631 | 11/084,796 | 11/084,742 | 10/291,555 | 10/685,583 |
| 10/685,584 | 10/954,170 | 11/020,106 | 11/020,260 | 11/020,321 | 11/020,319 | 11/107,944 |
| 11/107,941 | 11/082,940 | 11/082,815 | 11/182,002 | 11/202,251 | 11/202,252 | 11/202,218 |
| 11/206,778 | 11/203,424 | 11/222,977 | 11/491,225 | 11/491,121 | 11/454,902 | 11/442,385 |
| 11/478,590 | 11/520,170 | 11/603,057 | 11/706,964 | 11/739,032 | 11/830,848 | 11/830,849 |
| 11/839,542 | 11/866,394 | 11/203,205 | 10/982,975 | 10/983,029 | 10/901,154 | 10/932,044 |
| 10/962,412 | 10/965,933 | 10/974,742 | 10/982,974 | 10/986,375 | 11/107,817 | 11/653,219 |
| 11/706,309 | 11/730,389 | 60/953,443 | 11/866,387 | 60/974,077 | 10/778,059 | 10/778,063 |
| 10/917,436 | 10/943,856 | 10/943,878 | 10/943,849 | 11/144,840 | 11/155,556 | 11/155,557 |
| 11/193,481 | 11/193,435 | 11/193,482 | 11/193,479 | 11/298,474 | 11/488,832 | 11/495,814 |
| 11/495,823 | 11/495,822 | 11/495,821 | 11/495,820 | 11/653,242 | 60/911,260 | 11/829,936 |
| 11/839,494 | 11/866,305 | 11/866,313 | 11/866,324 | 11/866,336 | 11/866,348 | 11/866,359 |
| 10/537,159 | 10/786,631 | 10/893,372 | 10/971,146 | 11/842,948 | 10/492,169 | 10/531,229 |
| 10/510,392 | 11/074,800 | 11/075,917 | 11/102,843 | 11/737,094 | 11/753,570 | 11/782,596 |
| 11/865,711 | 11/856,061 | 11/856,062 | 11/856,064 | 11/856,066 | 11/672,522 | 11/672,950 |
| 11/672,947 | 11/672,891 | 11/672,954 | 11/672,533 | 11/754,321 | 11/754,320 | 11/754,319 |
| 11/754,318 | 11/754,317 | 11/754,316 | 11/754,315 | 11/754,314 | 11/754,313 | 11/754,312 |
| 11/754,311 | 11/505,933 | 11/635,480 | 11/706,303 | 11/709,084 | 11/744,143 | 11/779,845 |
| 11/782,589 | 11/863,256 | 11/338,783 | 11/603,823 | 10/727,159 | 10/727,160 | 11/442,131 |
| 11/474,278 | 11/749,750 | 11/749,749 | 11/039,866 | 11/148,237 | 11/478,599 | 11/521,388 |
| 11/482,981 | 11/743,662 | 11/743,661 | 11/743,659 | 11/743,655 | 11/743,657 | 11/752,900 |
| 11/650,537 | 11/712,540 | 10/854,509 | 10/854,516 | 10/854,515 | 10/854,490 | 10/854,523 |
| 10/854,527 | 10/854,519 | 10/854,513 | 10/854,501 | 10/934,628 | 11/601,757 | 11/706,295 |
| 11/735,881 | 11/748,483 | 11/749,123 | 11/766,061 | 11/775,135 | 11/772,235 | 11/778,569 |
| 11/829,942 | 10/954,168 | 11/107,798 | 11/176,372 | 11/478,607 | 11/545,502 | 11/583,943 |
| 11/585,946 | 11/653,239 | 11/653,238 | 11/764,781 | 11/764,782 | 11/779,884 | 11/845,666 |
| 11/544,764 | 11/544,765 | 11/544,772 | 11/544,773 | 11/544,774 | 11/544,775 | 11/544,776 |
| 11/544,766 | 11/544,767 | 11/544,770 | 11/544,769 | 11/544,777 | 11/544,763 | 11/293,804 |
| 11/293,840 | 11/293,803 | 11/293,833 | 11/293,834 | 11/293,835 | 11/293,836 | 11/293,837 |
| 11/293,792 | 11/293,794 | 11/293,839 | 11/293,826 | 11/293,829 | 11/293,830 | 11/293,827 |
| 11/293,828 | 11/293,823 | 11/293,824 | 11/293,831 | 11/293,815 | 11/293,819 | 11/293,818 |
| 11/293,817 | 11/838,875 | 11/482,978 | 11/640,356 | 11/640,357 | 11/640,358 | 11/640,359 |
| 11/640,360 | 11/640,355 | 11/679,786 | 11/474,272 | 11/474,315 | 11/583,874 | 11/706,322 |
| 11/706,968 | 11/749,119 | 11/749,157 | 11/782,590 | 11/855,152 | 11/855,151 | 11/758,640 |
| 11/775,143 | 11/838,877 | 11/778,567 | 11/852,958 | 11/852,907 | 11/872,038 | 11/293,820 |
| 11/293,813 | 11/293,822 | 11/293,812 | 11/293,814 | 11/293,793 | 11/293,842 | 11/293,811 |
| 11/293,807 | 11/293,806 | 11/293,805 | 11/293,810 | 11/688,863 | 11/688,864 | 11/688,865 |
| 11/688,866 | 11/688,867 | 11/688,868 | 11/688,869 | 11/688,871 | 11/688,872 | 11/688,873 |
| 11/741,766 | 11/482,982 | 11/482,983 | 11/482,984 | 11/495,819 | 11/677,049 | 11/677,050 |
| 11/677,051 | 10/760,180 | 10/760,219 | 10/760,237 | 10/760,220 | 10/760,252 | 10/760,265 |
| 11/446,233 | 11/503,083 | 11/503,081 | 11/516,487 | 11/743,672 | 11/744,126 | 11/743,673 |
| 11/543,047 | 11/707,056 | 11/744,211 | 11/767,526 | 11/779,846 | 11/764,227 | 11/829,943 |
| 11/829,944 | 11/014,727 | 10/760,257 | 11/544,547 | 11/585,925 | 11/593,000 | 11/706,298 |
| 11/706,296 | 11/730,760 | 11/730,407 | 11/730,787 | 11/735,977 | 11/736,527 | 11/754,359 |
| 11/778,061 | 11/765,398 | 11/778,556 | 11/829,937 | 11/780,470 | 11/866,399 | 10/853,270 |
| 10/980,184 | 10/983,082 | 10/982,833 | 10/992,748 | 11/013,363 | 11/026,135 | 11/064,005 |
| 11/239,031 | 11/281,419 | 11/484,744 | 11/525,857 | 11/540,569 | 11/583,869 | 11/585,947 |
| 11/604,309 | 11/604,303 | 11/643,844 | 11/655,940 | 11/653,320 | 11/706,323 | 11/706,963 |
| 11/696,186 | 11/730,390 | 11/737,139 | 11/737,749 | 11/749,122 | 11/754,361 | 11/764,775 |
| 11/768,872 | 11/775,156 | 11/779,271 | 11/779,272 | 11/829,938 | 11/839,502 | 11/858,852 |
| 11/862,188 | 019863/0806 | 11/872,618 | 10/485,737 | 10/485,744 | 10/509,998 | 11/165,027 |
| 11/225,157 | 11/349,519 | 11/504,602 | 11/520,572 | 11/583,858 | 11/583,895 | 11/585,976 |
| 11/635,488 | 11/706,952 | 11/706,307 | 11/740,287 | 11/758,643 | 11/778,572 | 11/863,260 |
| 10/753,478 | 11/202,217 | 11/298,635 | 11/478,588 | 11/525,861 | 11/545,504 | 11/635,485 |

-continued

| | | | | | | |
|---|---|---|---|---|---|---|
| 11/730,391 | 11/730,788 | 11/749,148 | 11/749,149 | 11/749,152 | 11/749,151 | 11/759,886 |
| 11/248,832 | 11/485,255 | 11/123,008 | 11/478,591 | 11/482,940 | 11/503,061 | 11/505,938 |
| 11/540,576 | 11/592,991 | 11/599,342 | 11/600,803 | 11/604,302 | 11/635,535 | 11/635,486 |
| 11/643,842 | 11/706,301 | 11/707,039 | 11/730,388 | 11/730,785 | 11/768,875 | 11/779,847 |
| 11/829,940 | 11,847,240 | 11/834,625 | 11/863,210 | 11/865,680 | 10/991,402 | 11/298,530 |
| 11/330,061 | 11/329,284 | 11/454,901 | 11/442,134 | 11/450,441 | 11/474,274 | 10/804,057 |
| 10/804,036 | 11/540,575 | 11/583,937 | 11/635,490 | 11/635,525 | 11/706,366 | 11/706,310 |
| 11/706,308 | 11/785,108 | 11/748,485 | 11/764,778 | 11/766,025 | 11/834,635 | 11/860,420 |
| 11/863,118 | 11/866,307 | 11/866,340 | 11/869,684 | 11/869,694 | 11/758,648 | 11/834,634 |
| 11/782,588 | 11/935,958 | 11/924,608 | 11/869,710 | 11/927,403 | 11/940,304 | 11/872,037 |
| 11/685,090 | 11/940,291 | 11/934,071 | 09/575,181 | 11/863,271 | 11/849,360 | 11/766,713 |
| 11/841,647 | 11/944,450 | 11/935,389 | 11/936,062 | 11/934,027 | 11/934,018 | 11/936,060 |
| 11/877,667 | 11/877,668 | 11/926,121 | 11/764,808 | 11/934,077 | 11/944,404 | 11/936,638 |
| 11/754,310 | 11/940,302 | 11/940,235 | 11/875,936 | 11/926,109 | 11/929,567 | 11/870,342 |
| 11/935,274 | 11/937,239 | 11/872,637 | 11/944,401 | 11/940,215 | 11/872,714 | 11/779,848 |
| 11/870,327 | 11/934,780 | 11/935,992 | RRB038US | 11/872,719 | 11/872,718 | 11/934,781 |
| 29/279,123 | 11/766,043 | 11/923,651 | 11/930,001 | 11/944,451 | 11/859,791 | 11/874,178 |
| 11/936,064 | 11/865,668 | 11/874,168 | 11/874,203 | 11/730,786 | 11/874,156 | 11/923,602 |
| 11/839,541 | 11/865,693 | 11/869,722 | 11/876,592 | 10/943,905 | 10/943,906 | 10/943,904 |
| 10/943,903 | 10/943,902 | 11/474,280 | 10/503,900 | 10/503,922 | 10/503,917 | 10/503,927 |
| 10/920,368 | 10/920,284 | 10/470,947 | 10/203,559 | 10/636,283 | 11/592,181 | 10/636,219 |
| 10/666,124 | 10/683,217 | 10/753,458 | 10/780,625 | 10/831,234 | 10/831,233 | 10/853,117 |
| 11/006,787 | 11/736,540 | 11/212,759 | 11/730,409 | 11/003,786 | 11/003,701 | 11/060,803 |
| 10/753,499 | 11/442,103 | 11/246,676 | 11/246,677 | 11/246,671 | 11/246,670 | 10/815,630 |
| 11/834,628 | 11/839,497 | 11/599,341 | 11/696,650 | 11/056,146 | 10/636,230 | 11/706,297 |
| 11/730,387 | 10/913,372 | 10/913,376 | 11/172,816 | 10/922,872 | 10/922,886 | 10/922,877 |
| 11/293,797 | 11/124,202 | 11/124,197 | 11/124,198 | 11/124,151 | 11/124,160 | 11/124,175 |
| 11/124,173 | 11/124,155 | 11/124,194 | 11/124,164 | 11/124,195 | 11/124,166 | 11/124,150 |
| 11/124,172 | 11/124,165 | 11/124,186 | 11/124,184 | 11/124,182 | 11/124,171 | 11/124,188 |
| 11/124,189 | 11/124,190 | 11/124,177 | 11/735,490 | 11/228,500 | 11/228,504 | 11/228,516 |
| 11/228,477 | 10/868,866 | 11/242,917 | 11/604,323 | 10/534,811 | 10/534,812 | 11/246,691 |
| 11/246,702 | 11/246,668 | 10/760,253 | 10/760,189 | 11/706,965 | 11/246,672 | 10/728,784 |
| 10/728,779 | 10/773,185 | 10/773,187 | 11/060,805 | 11/188,017 | 11/097,309 | 11/097,299 |
| 11/097,310 | 11/097,213 | 11/756,624 | 11/756,627 | 11/712,434 | 10/291,825 | 10/831,232 |
| 10/943,872 | 10/992,713 | 11/082,829 | 11/123,136 | 11/154,676 | 11/286,334 | 11/329,187 |
| 11/349,143 | 11/442,428 | 10/743,671 | 10/900,129 | 10/962,552 | 10/965,733 | 11/250,465 |
| 11/730,392 | 10/778,058 | 10/778,060 | 10/778,062 | 10/778,061 | 10/778,057 | 10/917,467 |
| 10/919,379 | 10/291,559 | 11/074,802 | 11,749,158 | 10/492,161 | 10/502,575 | 10/531,733 |
| 10/683,040 | 10/291,546 | 11/074,777 | 11/540,727 | 10/727,157 | 10/727,192 | 10/727,274 |
| 10/727,161 | 10/727,158 | 10/754,536 | 10/727,227 | 10/934,720 | 11/499,749 | 11/738,518 |
| 10/854,511 | 10/854,524 | 10/854,514 | 11/014,731 | 10/636,234 | 10/636,233 | 11/065,357 |
| 11/503,085 | 11/544,771 | 11/293,816 | 10/760,254 | 10/760,210 | 10/760,222 | 10/760,204 |
| 11/014,764 | 11/014,763 | 11/014,757 | 11/014,723 | 11/014,725 | 11/014,738 | 11/014,734 |
| 11/014,750 | 11/014,718 | 11/014,717 | 11/014,716 | 11/014,732 | 11/097,268 | 11/097,185 |
| 11/097,184 | 11/293,821 | 11/495,818 | 10/760,213 | 11/202,107 | 11/604,324 | 11/185,722 |
| 10/760,214 | 10/962,427 | 10/962,402 | 10/962,425 | 10/962,410 | 11/706,327 | 11/753,566 |
| 11/223,114 | 11/223,021 | 11/223,020 | 11/223,019 | 10/898,214 | 10/976,081 | 10/982,834 |
| 10/992,754 | 11/026,046 | 11/064,004 | 11/075,918 | 11/084,757 | 11/329,188 | 11/329,140 |
| 11/592,985 | 11/706,381 | 11/740,273 | 10/485,738 | 10/510,152 | 10/510,151 | 11/754,367 |
| 11/442,133 | 11/123,007 | 11/177,394 | 11/239,029 | 11/248,428 | 11/248,434 | 11/155,627 |
| 11/159,197 | 11/739,080 | 11/225,173 | 11/330,054 | 11/442,125 | 11/499,741 | 11/520,570 |
| 6,276,850 | 6,520,631 | 6,158,907 | 6,539,180 | 6,270,177 | 6,405,055 | 6,628,430 |
| 6,835,135 | 6,626,529 | 6,981,769 | 7,125,338 | 7,125,337 | 7,136,186 | 7,286,260 |
| 7,145,689 | 7,130,075 | 7,081,974 | 7,177,055 | 7,209,257 | 6,443,555 | 7,161,715 |
| 7,154,632 | 7,158,258 | 7,148,993 | 7,075,684 | 6,966,659 | 6,988,841 | 7,077,748 |
| 7,255,646 | 7,070,270 | 7,014,307 | 7,158,809 | 7,217,048 | 7,271,829 | 7,215,441 |
| 7,056,040 | 6,942,334 | 6,799,853 | 7,237,896 | 6,749,301 | 7,137,678 | 7,252,379 |
| 7,144,107 | 7,220,068 | 7,270,410 | 7,241,005 | 7,108,437 | 7,140,792 | 7,224,274 |
| 7,195,325 | 7,229,164 | 7,150,523 | 7,154,580 | 6,906,778 | 7,167,158 | 7,128,269 |
| 6,688,528 | 6,986,613 | 6,641,315 | 7,278,702 | 7,150,524 | 7,155,395 | 6,915,140 |
| 6,999,206 | 6,795,651 | 6,883,910 | 7,118,481 | 7,136,198 | 7,092,130 | 6,786,661 |
| 6,808,325 | 7,219,990 | 6,750,901 | 6,476,863 | 6,788,336 | 6,322,181 | 6,597,817 |
| 6,227,648 | 6,727,948 | 6,690,419 | 6,619,654 | 6,969,145 | 6,679,582 | 6,568,670 |
| 6,866,373 | 7,280,247 | 7,008,044 | 6,742,871 | 6,966,628 | 6,644,781 | 6,969,143 |
| 6,767,076 | 6,834,933 | 6,692,113 | 6,913,344 | 6,727,951 | 7,128,395 | 7,036,911 |
| 7,032,995 | 6,969,151 | 6,955,424 | 6,969,162 | 6,942,315 | 7,234,797 | 6,986,563 |
| 7,286,162 | 7,283,159 | 7,077,330 | 6,196,541 | 7,226,144 | 7,267,428 | 7,093,929 |
| 7,290,862 | 6,195,150 | 6,362,868 | 6,831,681 | 6,431,669 | 6,362,869 | 6,472,052 |
| 6,356,715 | 6,894,694 | 6,636,216 | 6,366,693 | 6,329,990 | 6,459,495 | 6,137,500 |
| 6,690,416 | 7,050,143 | 6,398,328 | 7,110,024 | 6,431,704 | 6,879,341 | 6,415,054 |
| 6,665,454 | 6,542,645 | 6,486,886 | 6,381,361 | 6,317,192 | 6,850,274 | 6,646,757 |
| 6,624,848 | 6,357,135 | 6,271,931 | 6,353,772 | 6,106,147 | 6,665,008 | 6,304,291 |
| 6,305,770 | 6,289,262 | 6,315,200 | 6,217,165 | 6,496,654 | 6,859,225 | 6,924,835 |
| 6,647,369 | 6,943,830 | 7,021,745 | 6,712,453 | 6,460,971 | 6,428,147 | 6,416,170 |
| 6,402,300 | 6,464,340 | 6,612,687 | 6,412,912 | 6,447,099 | 6,837,567 | 6,505,913 |
| 7,128,845 | 6,733,684 | 7,249,108 | 6,566,858 | 6,331,946 | 6,246,970 | 6,442,525 |
| 6,374,354 | 7,246,098 | 6,816,968 | 6,757,832 | 6,334,190 | 6,745,331 | 7,249,109 |
| 7,197,642 | 7,093,139 | 7,210,038 | 7,119,836 | 7,283,162 | 7,286,169 | 7,170,652 |
| 6,967,750 | 6,995,876 | 7,099,051 | 7,172,191 | 7,243,916 | 7,222,845 | 7,285,227 |
| 7,063,940 | 7,193,734 | 7,086,724 | 7,090,337 | 7,278,723 | 7,140,717 | 7,256,824 |

-continued

| | | | | | | |
|---|---|---|---|---|---|---|
| 7,140,726 | 7,156,512 | 7,186,499 | 6,750,944 | 7,291,447 | 6,985,207 | 6,773,874 |
| 6,650,836 | 7,250,975 | 6,880,929 | 7,236,188 | 7,236,187 | 7,155,394 | 7,055,927 |
| 6,986,562 | 7,052,103 | 7,289,142 | 7,095,533 | 6,914,686 | 6,896,252 | 6,820,871 |
| 6,834,851 | 6,848,686 | 6,830,246 | 6,851,671 | 7,092,011 | 7,187,404 | 6,878,299 |
| 6,929,348 | 6,921,154 | 6,913,346 | 7,246,897 | 7,077,515 | 6,913,875 | 7,021,758 |
| 7,033,017 | 7,161,709 | 7,099,033 | 7,147,294 | 7,156,494 | 7,032,998 | 7,044,585 |
| 7,296,867 | 6,994,424 | 7,258,435 | 7,097,263 | 7,001,012 | 7,004,568 | 7,040,738 |
| 7,188,933 | 7,027,080 | 7,025,446 | 6,991,321 | 7,131,715 | 7,261,392 | 7,207,647 |
| 7,182,435 | 7,097,285 | 7,097,284 | 7,083,264 | 7,147,304 | 7,232,203 | 7,156,498 |
| 7,201,471 | 7,210,764 | 6,710,457 | 6,775,906 | 6,507,099 | 7,221,043 | 7,107,674 |
| 7,154,172 | 7,247,941 | 6,530,339 | 6,631,897 | 6,851,667 | 6,830,243 | 6,860,479 |
| 6,997,452 | 7,000,913 | 7,204,482 | 6,238,044 | 6,425,661 | 7,258,417 | 7,270,395 |
| 7,255,419 | 7,284,819 | 7,229,148 | 7,258,416 | 7,273,263 | 7,270,393 | 6,984,017 |
| 7,156,497 | 7,284,820 | 7,246,875 | 6,431,777 | 6,334,664 | 6,447,113 | 7,239,407 |
| 6,398,359 | 6,652,089 | 6,652,090 | 7,057,759 | 6,631,986 | 7,187,470 | 7,280,235 |
| 6,471,331 | 6,676,250 | 6,347,864 | 6,439,704 | 6,425,700 | 6,588,952 | 6,626,515 |
| 6,722,758 | 6,871,937 | 7,249,942 | 7,206,654 | 7,162,324 | 7,162,325 | 7,231,275 |
| 7,146,236 | 7,278,847 | 6,997,698 | 7,220,112 | 7,231,276 | 7,220,115 | 7,195,475 |
| 7,144,242 | 6,786,420 | 6,827,282 | 6,948,661 | 7,073,713 | 7,093,762 | 7,083,108 |
| 7,222,799 | 7,201,319 | 7,032,899 | 6,854,724 | 6,350,023 | 6,318,849 | 6,592,207 |
| 6,439,699 | 6,312,114 | 7,040,823 | 7,125,185 | 7,229,226 | 7,243,835 | 7,251,050 |
| 7,097,094 | 7,137,549 | 7,156,292 | 7,137,566 | 7,131,596 | 7,128,265 | 7,207,485 |
| 7,197,374 | 7,175,089 | 7,178,719 | 7,207,483 | 7,296,737 | 7,270,266 | 7,267,273 |
| 7,128,270 | 7,150,398 | 7,159,777 | 7,188,769 | 7,097,106 | 7,070,110 | 7,243,849 |
| 6,227,652 | 6,213,588 | 6,213,589 | 6,231,163 | 6,247,795 | 6,394,581 | 6,244,691 |
| 6,257,704 | 6,416,168 | 6,220,694 | 6,257,705 | 6,247,794 | 6,234,610 | 6,247,793 |
| 6,264,306 | 6,241,342 | 6,247,792 | 6,264,307 | 6,254,220 | 6,234,611 | 6,302,528 |
| 6,283,582 | 6,239,821 | 6,338,547 | 6,247,796 | 6,557,977 | 6,390,603 | 6,362,843 |
| 6,293,653 | 6,312,107 | 6,227,653 | 6,234,609 | 6,238,040 | 6,188,415 | 6,227,654 |
| 6,209,989 | 6,247,791 | 6,336,710 | 6,217,153 | 6,416,167 | 6,243,113 | 6,283,581 |
| 6,247,790 | 6,260,953 | 6,267,469 | 6,588,882 | 6,742,873 | 6,918,655 | 6,547,371 |
| 6,938,989 | 6,598,964 | 6,923,526 | 6,273,544 | 6,309,048 | 6,420,196 | 6,443,558 |
| 6,439,689 | 6,378,989 | 6,848,181 | 6,634,735 | 6,299,289 | 6,299,290 | 6,425,654 |
| 6,902,255 | 6,623,101 | 6,406,129 | 6,505,916 | 6,457,809 | 6,550,895 | 6,457,812 |
| 7,152,962 | 6,428,133 | 7,216,956 | 7,080,895 | 7,182,437 | 6,224,780 | 6,235,212 |
| 6,280,643 | 6,284,147 | 6,214,244 | 6,071,750 | 6,267,905 | 6,251,298 | 6,258,285 |
| 6,225,138 | 6,241,904 | 6,299,786 | 6,866,789 | 6,231,773 | 6,190,931 | 6,248,249 |
| 6,290,862 | 6,241,906 | 6,565,762 | 6,241,905 | 6,451,216 | 6,231,772 | 6,274,056 |
| 6,290,861 | 6,248,248 | 6,306,671 | 6,331,258 | 6,110,754 | 6,294,101 | 6,416,679 |
| 6,264,849 | 6,254,793 | 6,245,246 | 6,855,264 | 6,235,211 | 6,491,833 | 6,264,850 |
| 6,258,284 | 6,312,615 | 6,228,668 | 6,180,427 | 6,171,875 | 6,267,904 | 6,245,247 |
| 6,315,914 | 7,169,316 | 6,526,658 | 7,210,767 | 6,665,094 | 6,450,605 | 6,512,596 |
| 6,654,144 | 7,125,090 | 6,687,022 | 7,072,076 | 7,092,125 | 7,215,443 | 7,136,195 |
| 7,077,494 | 6,877,834 | 6,969,139 | 7,283,280 | 6,912,067 | 7,277,205 | 7,154,637 |
| 7,070,251 | 6,851,782 | 6,843,545 | 7,079,286 | 7,064,867 | 7,065,247 | 7,027,177 |
| 7,218,415 | 7,064,873 | 6,954,276 | 7,061,644 | 7,092,127 | 7,059,695 | 7,177,052 |
| 7,270,394 | 7,188,921 | 7,187,469 | 7,196,820 | 7,283,281 | 7,251,051 | 7,245,399 |
| 6,231,148 | 6,293,658 | 6,614,560 | 6,238,033 | 6,312,070 | 6,238,111 | 6,378,970 |
| 6,196,739 | 6,270,182 | 6,152,619 | 7,006,143 | 6,876,394 | 6,738,096 | 6,970,186 |
| 6,287,028 | 6,412,993 | 7,204,941 | 7,282,164 | 7,278,727 | 7,138,391 | 7,153,956 |
| 7,122,076 | 7,148,345 | 7,252,366 | 7,275,811 | 7,234,795 | 7,147,792 | 7,175,774 |
| 7,284,921 | 7,236,271 | 6,238,115 | 6,386,535 | 6,398,344 | 6,612,240 | 6,752,549 |
| 6,805,049 | 6,971,313 | 6,899,480 | 6,860,664 | 6,925,935 | 6,966,636 | 7,024,995 |
| 7,284,852 | 6,926,455 | 7,056,038 | 6,869,172 | 7,021,843 | 6,988,845 | 6,964,533 |
| 6,981,809 | 7,284,822 | 7,258,067 | 7,222,941 | 7,284,925 | 7,278,795 | 7,249,904 |
| 6,087,638 | 6,340,222 | 6,041,600 | 6,299,300 | 6,067,797 | 6,286,935 | 6,044,646 |
| 6,382,769 | 6,787,051 | 6,938,990 | 7,152,972 | D529952 | 6,390,605 | 6,322,195 |
| 6,612,110 | 6,480,089 | 6,460,778 | 6,305,788 | 6,426,014 | 6,364,453 | 6,457,795 |
| 6,315,399 | 6,338,548 | 7,040,736 | 6,938,992 | 6,994,425 | 6,863,379 | 6,540,319 |
| 6,994,421 | 6,984,019 | 7,008,043 | 6,997,544 | 6,328,431 | 6,991,310 | 7,140,723 |
| 6,328,425 | 6,982,184 | 7,267,423 | 7,134,741 | 7,066,577 | 7,152,945 | 7,021,744 |
| 6,991,320 | 7,155,911 | 6,595,624 | 7,152,943 | 7,125,103 | 7,290,857 | 7,285,437 |
| 7,229,151 | 7,237,873 | 7,213,907 | 6,417,757 | 7,095,309 | 6,854,825 | 6,623,106 |
| 6,672,707 | 6,575,561 | 6,817,700 | 6,588,885 | 7,075,677 | 6,428,139 | 6,575,549 |
| 6,846,692 | 6,425,971 | 7,063,993 | 6,383,833 | 6,955,414 | 6,412,908 | 6,746,105 |
| 6,953,236 | 6,412,904 | 7,128,388 | 6,398,343 | 6,652,071 | 6,793,323 | 6,659,590 |
| 6,676,245 | 7,201,460 | 6,464,332 | 6,659,593 | 6,478,406 | 6,978,613 | 6,439,693 |
| 6,502,306 | 6,966,111 | 6,863,369 | 6,428,142 | 6,874,868 | 6,390,591 | 6,799,828 |
| 6,896,358 | 7,018,016 | 6,328,417 | 6,322,194 | 6,382,779 | 6,629,745 | 6,565,193 |
| 6,609,786 | 6,609,787 | 6,439,908 | 6,684,503 | 6,843,551 | 6,764,166 | 6,561,617 |
| 6,557,970 | 6,546,628 | 6,652,074 | 6,820,968 | 7,175,260 | 6,682,174 | 6,648,453 |
| 6,834,932 | 6,682,176 | 6,998,062 | 6,767,077 | 7,278,717 | 6,755,509 | 6,692,108 |
| 6,672,709 | 7,086,718 | 6,672,710 | 6,669,334 | 7,152,958 | 7,281,782 | 6,824,246 |
| 7,264,336 | 6,669,333 | 6,820,967 | 6,736,489 | 7,264,335 | 6,719,406 | 7,222,943 |
| 7,188,419 | 7,168,166 | 6,974,209 | 7,086,719 | 6,974,210 | 7,195,338 | 7,252,775 |
| 7,101,025 | 7,156,508 | 7,159,972 | 7,083,271 | 7,165,834 | 7,080,894 | 7,201,469 |
| 7,090,336 | 7,156,489 | 7,083,257 | 7,258,422 | 7,255,423 | 7,219,980 | 7,118,192 |
| 7,077,505 | 7,198,354 | 7,077,504 | 7,198,355 | 7,152,959 | 7,213,906 | 7,178,901 |
| 7,222,938 | 7,108,353 | 7,104,629 | 7,261,401 | 7,246,886 | 7,128,400 | 7,108,355 |
| 6,991,322 | 7,287,836 | 7,118,197 | 7,077,493 | 6,962,402 | 7,147,308 | 7,118,198 |

-continued

| | | | | | | |
|---|---|---|---|---|---|---|
| 7,168,790 | 7,172,270 | 7,229,155 | 6,830,318 | 7,195,342 | 7,175,261 | 7,108,356 |
| 7,118,202 | 7,134,744 | 7,134,743 | 7,182,439 | 7,210,768 | 7,134,745 | 7,156,484 |
| 7,118,201 | 7,111,926 | 7,018,021 | 7,128,402 | 7,284,839 | 7,246,885 | 7,229,156 |
| 7,258,427 | 7,278,716 | 7,246,876 | 7,147,306 | 7,261,394 | 7,156,289 | 7,178,718 |
| 7,225,979 | 7,079,712 | 6,825,945 | 6,813,039 | 7,190,474 | 6,987,506 | 6,824,044 |
| 7,038,797 | 6,980,318 | 6,816,274 | 7,102,772 | 6,681,045 | 6,678,499 | 6,679,420 |
| 6,963,845 | 6,976,220 | 6,728,000 | 7,110,126 | 7,173,722 | 6,976,035 | 6,813,558 |
| 6,766,942 | 6,965,454 | 6,995,859 | 7,088,459 | 6,720,985 | 7,286,113 | 6,922,779 |
| 6,978,019 | 6,847,883 | 7,131,058 | 7,295,839 | 6,959,298 | 6,973,450 | 7,150,404 |
| 6,965,882 | 7,233,924 | 7,175,079 | 7,162,259 | 6,718,061 | 7,012,710 | 6,825,956 |
| 7,222,098 | 7,263,508 | 7,031,010 | 6,972,864 | 6,862,105 | 7,009,738 | 6,989,911 |
| 6,982,807 | 6,829,387 | 6,714,678 | 6,644,545 | 6,609,653 | 6,651,879 | 7,293,240 |
| 7,044,363 | 7,004,390 | 6,867,880 | 7,034,953 | 6,987,581 | 7,216,224 | 7,162,269 |
| 7,162,222 | 7,290,210 | 7,293,233 | 7,293,234 | 6,850,931 | 6,865,570 | 6,847,961 |
| 7,162,442 | 7,159,784 | 6,889,896 | 7,174,056 | 6,996,274 | 7,162,088 | 7,259,884 |
| 7,167,270 | 6,986,459 | 7,181,448 | 7,231,293 | 7,174,329 | 7,295,922 | 7,200,591 |
| 6,991,153 | 6,991,154 | 7,225,402 | 7,271,931 | 7,068,382 | 7,007,851 | 6,957,921 |
| 6,457,883 | 7,044,381 | 7,094,910 | 7,091,344 | 7,122,685 | 7,038,066 | 7,099,019 |
| 7,062,651 | 6,789,194 | 6,789,191 | 7,278,018 | 6,644,642 | 6,502,614 | 6,622,999 |
| 6,669,385 | 6,827,116 | 7,011,128 | 6,549,935 | 6,987,573 | 6,727,996 | 6,591,884 |
| 6,439,706 | 6,760,119 | 7,064,851 | 6,826,547 | 6,290,349 | 6,428,155 | 6,785,016 |
| 6,831,682 | 6,741,871 | 6,927,871 | 6,980,306 | 6,965,439 | 6,840,606 | 7,036,918 |
| 6,977,746 | 6,970,264 | 7,068,389 | 7,093,991 | 7,190,491 | 7,177,054 | 7,180,609 |
| 7,292,363 | 7,202,959 | 6,982,798 | 6,870,966 | 6,822,639 | 6,474,888 | 6,627,870 |
| 6,724,374 | 6,788,982 | 7,263,270 | 6,788,293 | 6,946,672 | 6,737,591 | 7,091,960 |
| 6,792,165 | 7,105,753 | 6,795,593 | 6,980,704 | 6,768,821 | 7,132,612 | 7,041,916 |
| 6,797,895 | 7,015,901 | 7,289,882 | 7,148,644 | 7,096,199 | 7,286,887 | 7,218,978 |
| 7,245,294 | 7,277,085 | 7,187,370 | 7,019,319 | 7,043,096 | 7,148,499 | 7,245,760 |
| 7,055,739 | 7,233,320 | 6,830,196 | 6,832,717 | 7,182,247 | 7,120,853 | 7,082,562 |
| 6,843,420 | 6,789,731 | 7,057,608 | 6,766,944 | 6,766,945 | 7,289,103 | 7,264,173 |
| 10/409,864 | 7,108,192 | 7,111,791 | 7,077,333 | 6,983,878 | 7,134,598 | 6,929,186 |
| 6,994,264 | 7,017,826 | 7,014,123 | 7,134,601 | 7,150,396 | 7,017,823 | 7,025,276 |
| 7,284,701 | 7,080,780 | 6,957,768 | 7,170,499 | 7,106,888 | 7,123,239 | 6,982,701 |
| 6,982,703 | 7,227,527 | 6,786,397 | 6,947,027 | 6,975,299 | 7,139,431 | 7,048,178 |
| 7,118,025 | 6,839,053 | 7,015,900 | 7,010,147 | 7,133,557 | 6,914,593 | 6,938,826 |
| 7,278,566 | 7,123,245 | 6,992,662 | 7,190,346 | 7,221,781 | 7,213,756 | 7,180,507 |
| 7,263,225 | 7,287,688 | 6,593,166 | 7,132,679 | 6,940,088 | 7,119,357 | 6,755,513 |
| 6,974,204 | 6,409,323 | 7,055,930 | 6,281,912 | 6,893,109 | 6,604,810 | 6,824,242 |
| 6,318,920 | 7,210,867 | 6,488,422 | 6,655,786 | 6,457,810 | 6,485,135 | 6,796,731 |
| 6,904,678 | 6,641,253 | 7,125,106 | 6,786,658 | 7,097,273 | 6,824,245 | 7,222,947 |
| 6,918,649 | 6,860,581 | 6,929,351 | 7,063,404 | 6,969,150 | 7,004,652 | 6,871,938 |
| 6,905,194 | 6,846,059 | 6,997,626 | 7,029,098 | 6,966,625 | 7,114,794 | 7,207,646 |
| 7,077,496 | 7,284,831 | 7,152,938 | 7,182,434 | 7,182,430 | 7,032,993 | 7,172,266 |
| 7,258,430 | 7,128,392 | 7,210,866 | 7,287,831 | 6,804,030 | 6,807,315 | 6,771,811 |
| 6,683,996 | 7,271,936 | 6,965,691 | 7,058,219 | 7,289,681 | 7,187,807 | 7,181,063 |
| 7,121,639 | 7,165,824 | 7,152,942 | 7,181,572 | 7,096,137 | 7,278,034 | 7,188,282 |
| 7,171,323 | 7,278,697 | 6,795,215 | 7,070,098 | 7,154,638 | 6,805,419 | 6,859,289 |
| 6,977,751 | 6,398,332 | 6,394,573 | 6,622,923 | 6,747,760 | 6,921,144 | 7,092,112 |
| 7,192,106 | 7,173,739 | 6,986,560 | 7,008,033 | 7,222,780 | 7,270,391 | 7,150,510 |
| 7,195,328 | 7,182,422 | 7,281,330 | 7,188,928 | 7,093,989 | 7,252,353 | 7,267,417 |
| 7,275,805 | 7,281,777 | 7,290,852 | 7,266,661 | 7,243,193 | 7,163,345 | D529081 |
| D541848 | D528597 | 6,924,907 | 6,712,452 | 6,416,160 | 6,238,043 | 6,958,826 |
| 6,812,972 | 6,553,459 | 6,967,741 | 6,956,669 | 6,903,766 | 6,804,026 | 7,259,889 |
| 6,975,429 | 7,301,567 | 7,274,485 | 7,139,084 | 7,173,735 | 7,068,394 | 7,286,182 |
| 7,086,644 | 7,250,977 | 7,146,281 | 7,023,567 | 7,136,183 | 7,083,254 | 6,796,651 |
| 7,061,643 | 7,057,758 | 6,894,810 | 6,995,871 | 7,085,010 | 7,092,126 | 7,123,382 |
| 7,061,650 | 6,986,573 | 6,974,212 | 7,173,737 | 7,246,868 | 7,137,699 | 7,148,994 |
| 7,077,497 | 7,248,376 | 7,173,729 | 7,270,494 | 7,201,468 | 7,234,802 | 7,287,846 |
| 7,156,511 | 7,258,432 | 7,097,291 | 7,083,273 | 7,198,352 | 7,201,470 | 7,121,655 |
| 7,232,208 | 7,083,272 | 7,261,400 | 7,249,822 | 7,270,405 | 7,249,833 | 7,284,816 |
| 7,284,845 | 7,255,430 | D528156 | 7,111,935 | 7,261,482 | 7,002,664 | 7,088,420 |
| 6,364,451 | 6,533,390 | 6,454,378 | 7,224,478 | 6,559,969 | 6,896,362 | 7,057,760 |
| 6,982,799 | 7,093,494 | 7,143,652 | 7,089,797 | 7,159,467 | 7,234,357 | 7,124,643 |
| 7,121,145 | 7,089,790 | 7,194,901 | 6,968,744 | 7,089,798 | 7,240,560 | 7,137,302 |
| 7,171,855 | 7,260,995 | 7,260,993 | 7,165,460 | 7,222,538 | 7,258,019 | 7,258,020 |
| 6,454,482 | 6,808,330 | 6,527,365 | 6,474,773 | 6,550,997 | 7,093,923 | 6,957,923 |
| 7,131,724 | 7,168,867 | 7,125,098 | 7,249,901 | 7,188,930 | D536031 | D531214 |
| 7,237,888 | 7,168,654 | 7,201,272 | 6,991,098 | 7,217,051 | 6,944,970 | 7,108,434 |
| 7,210,407 | 7,186,042 | 6,920,704 | 7,217,049 | 7,147,102 | 7,287,828 | 7,249,838 |
| 7,261,477 | 7,225,739 | 7,191,978 | 7,163,287 | 7,258,415 | 7,258,424 | 7,195,412 |
| 7,207,670 | 7,270,401 | 7,220,072 | D541849 | 6,716,666 | 6,949,217 | 6,750,083 |
| 7,014,451 | 6,777,259 | 6,923,524 | 6,557,978 | 6,991,207 | 6,766,998 | 6,967,354 |
| 6,759,723 | 6,870,259 | 6,925,875 | 7,095,109 | 7,145,696 | 7,193,482 | 7,134,739 |
| 7,222,939 | 7,164,501 | 7,118,186 | 7,201,523 | 7,226,159 | 7,249,839 | 7,108,343 |
| 7,154,626 | 7,079,292 | 7,233,421 | 7,063,408 | 7,032,996 | 7,217,046 | 6,948,870 |
| 7,195,336 | 7,070,257 | 7,093,922 | 6,988,789 | 7,246,871 | 7,187,468 | 7,196,814 |
| 7,268,911 | 7,265,869 | 7,128,384 | 7,164,505 | 7,284,805 | 7,025,434 | 7,298,519 |
| 7,280,244 | 7,206,098 | 7,265,877 | 7,193,743 | 7,168,777 | 7,195,329 | 7,198,346 |
| 7,281,786 | 6,959,983 | 7,128,386 | 7,097,104 | 7,083,261 | 7,070,258 | 7,083,275 |
| 7,110,139 | 6,994,419 | 6,935,725 | 7,178,892 | 7,219,429 | 6,988,784 | 7,289,156 |

-continued

| | | | | | | |
|---|---|---|---|---|---|---|
| 7,284,976 | 7,178,903 | 7,273,274 | 7,083,256 | 7,278,707 | 6,974,206 | 7,066,588 |
| 7,222,940 | 7,018,025 | 7,221,867 | 7,290,863 | 7,188,938 | 7,021,742 | 7,083,262 |
| 7,192,119 | 11/083,021 | 7,036,912 | 7,175,256 | 7,182,441 | 7,083,258 | 7,114,796 |
| 7,147,302 | 7,219,982 | 7,118,195 | 7,229,153 | 6,991,318 | 7,108,346 | 7,178,899 |
| 7,066,579 | 7,270,397 | 7,258,425 | 7,237,874 | 7,152,961 | 7,207,658 | 7,207,659 |
| 7,278,713 | 7,290,853 | 6,485,123 | 6,425,657 | 6,488,358 | 7,021,746 | 6,712,986 |
| 6,981,757 | 6,505,912 | 6,439,694 | 6,364,461 | 6,378,990 | 6,425,658 | 6,488,361 |
| 6,814,429 | 6,471,336 | 6,457,813 | 6,540,331 | 6,454,396 | 6,464,325 | 6,443,559 |
| 6,435,664 | 6,412,914 | 6,488,360 | 6,550,896 | 6,439,695 | 6,447,100 | 6,488,359 |
| 6,637,873 | 6,618,117 | 6,803,989 | 7,234,801 | 7,044,589 | 7,163,273 | 6,416,154 |
| 6,547,364 | 6,644,771 | 7,152,939 | 6,565,181 | 6,857,719 | 7,255,414 | 6,702,417 |
| 7,284,843 | 6,918,654 | 7,070,265 | 6,616,271 | 6,652,078 | 6,503,408 | 6,607,263 |
| 7,111,924 | 6,623,108 | 6,698,867 | 6,488,362 | 6,625,874 | 6,921,153 | 7,198,356 |
| 6,536,874 | 6,425,651 | 6,435,667 | 6,527,374 | 6,582,059 | 6,513,908 | 7,246,883 |
| 6,540,332 | 6,547,368 | 7,070,256 | 6,508,546 | 6,679,584 | 6,857,724 | 6,652,052 |
| 6,672,706 | 6,688,719 | 6,712,924 | 6,588,886 | 7,077,508 | 7,207,654 | 6,935,724 |
| 6,927,786 | 6,988,787 | 6,899,415 | 6,672,708 | 6,644,767 | 6,874,866 | 6,830,316 |
| 6,994,420 | 6,954,254 | 7,086,720 | 7,240,992 | 7,267,424 | 7,128,397 | 7,084,951 |
| 7,156,496 | 7,066,578 | 7,101,023 | 7,159,965 | 7,255,424 | 7,137,686 | 7,201,472 |
| 7,287,829 | 7,216,957 | 7,278,712 | 7,287,827 | 6,916,082 | 6,786,570 | 6,848,780 |
| 6,966,633 | 7,179,395 | 6,969,153 | 6,979,075 | 7,132,056 | 6,832,828 | 6,860,590 |
| 6,905,620 | 6,786,574 | 6,824,252 | 7,097,282 | 6,997,545 | 6,971,734 | 6,918,652 |
| 6,978,990 | 6,863,105 | 7,194,629 | 6,890,059 | 6,988,785 | 6,830,315 | 7,246,881 |
| 7,125,102 | 7,028,474 | 7,066,575 | 6,986,202 | 7,044,584 | 7,210,762 | 7,032,992 |
| 7,140,720 | 7,207,656 | 7,285,170 | 7,008,041 | 7,011,390 | 7,048,868 | 7,014,785 |
| 7,131,717 | 7,284,826 | 7,182,436 | 7,104,631 | 7,240,993 | 7,290,859 | 7,172,265 |
| 7,284,837 | 7,066,573 | 7,152,949 | 7,156,492 | 7,287,834 | 7,284,326 | 6,824,257 |
| 7,270,475 | 6,971,811 | 6,878,564 | 6,921,145 | 6,890,052 | 7,021,747 | 6,929,345 |
| 6,811,242 | 6,916,087 | 6,905,195 | 6,899,416 | 6,883,906 | 6,955,428 | 7,284,834 |
| 6,932,459 | 6,962,410 | 7,033,008 | 6,962,409 | 7,013,641 | 7,204,580 | 7,032,997 |
| 6,998,278 | 7,004,563 | 6,910,755 | 6,969,142 | 6,938,994 | 7,188,935 | 7,134,740 |
| 6,997,537 | 7,004,567 | 6,916,091 | 7,077,588 | 6,918,707 | 6,923,583 | 6,953,295 |
| 6,921,221 | 7,001,008 | 7,168,167 | 7,210,759 | 6,988,790 | 7,192,120 | 7,168,789 |
| 7,004,577 | 7,052,120 | 6,994,426 | 7,258,418 | 7,014,298 | 7,152,955 | 7,097,292 |
| 7,207,657 | 7,152,944 | 7,147,303 | 7,134,608 | 7,264,333 | 7,093,921 | 7,077,590 |
| 7,147,297 | 7,077,507 | 7,172,672 | 7,175,776 | 7,086,717 | 7,101,020 | 7,201,466 |
| 7,152,967 | 7,182,431 | 7,210,666 | 7,252,367 | 7,287,837 | 6,945,630 | 7,018,294 |
| 6,910,014 | 6,659,447 | 6,648,321 | 7,082,980 | 6,672,584 | 7,073,551 | 6,830,395 |
| 7,289,727 | 7,001,011 | 6,880,922 | 6,886,915 | 6,644,787 | 6,641,255 | 7,066,580 |
| 6,652,082 | 7,284,833 | 6,666,544 | 6,666,543 | 6,669,332 | 6,984,023 | 6,733,104 |
| 6,644,793 | 6,723,575 | 6,953,235 | 6,663,225 | 7,076,872 | 7,059,706 | 7,185,971 |
| 7,090,335 | 6,854,827 | 6,793,974 | 7,222,929 | 6,739,701 | 7,073,881 | 7,155,823 |
| 7,219,427 | 7,008,503 | 6,783,216 | 6,883,890 | 6,857,726 | 6,641,256 | 6,808,253 |
| 6,827,428 | 6,802,587 | 6,997,534 | 6,959,982 | 6,959,981 | 6,886,917 | 6,969,473 |
| 6,827,425 | 7,007,859 | 6,802,594 | 6,792,754 | 6,860,107 | 6,786,043 | 6,863,378 |
| 7,052,114 | 7,001,007 | 6,948,794 | 6,805,435 | 6,733,116 | 7,008,046 | 6,880,918 |
| 7,066,574 | 6,983,595 | 6,923,527 | 7,275,800 | 7,163,276 | 7,156,495 | 6,976,751 |
| 6,994,430 | 7,014,296 | 7,059,704 | 7,160,743 | 7,175,775 | 7,287,839 | 7,097,283 |
| 7,140,722 | 7,080,893 | 7,093,920 | 7,270,492 | 7,128,093 | 7,052,113 | 7,055,934 |
| 7,278,796 | 7,083,263 | 7,145,592 | 7,025,436 | 7,258,421 | 7,226,147 | 7,195,339 |
| 7,284,838 | 7,067,067 | 6,776,476 | 6,880,914 | 7,086,709 | 6,783,217 | 7,147,791 |
| 6,929,352 | 7,144,095 | 6,820,974 | 6,918,647 | 6,984,016 | 7,192,125 | 6,824,251 |
| 6,834,939 | 6,840,600 | 6,786,573 | 7,144,519 | 6,799,835 | 6,959,975 | 6,959,974 |
| 7,021,740 | 6,935,718 | 6,938,983 | 6,938,991 | 7,226,145 | 7,140,719 | 6,988,788 |
| 7,022,250 | 6,929,350 | 7,011,393 | 7,004,566 | 7,175,097 | 6,948,799 | 7,143,944 |
| 7,029,100 | 6,957,811 | 7,073,724 | 7,055,933 | 7,077,490 | 7,055,940 | 7,234,645 |
| 7,032,999 | 7,066,576 | 7,229,150 | 7,086,728 | 7,246,879 | 7,284,825 | 7,140,718 |
| 7,284,817 | 7,144,098 | 7,044,577 | 7,284,824 | 7,284,827 | 7,189,334 | 7,055,935 |
| 7,152,860 | 7,213,989 | 7,114,868 | 7,168,796 | 7,159,967 | 7,152,805 | 7,133,799 |
| 7,152,956 | 7,128,399 | 7,147,305 | 7,287,702 | 7,246,884 | 7,152,960 | 7,270,399 |
| 6,857,728 | 6,857,729 | 6,857,730 | 6,989,292 | 7,126,216 | 6,977,189 | 6,982,189 |
| 7,173,332 | 7,026,176 | 6,979,599 | 6,812,062 | 6,886,751 | 7,001,793 | 6,866,369 |
| 6,946,743 | 6,886,918 | 7,059,720 | 6,951,390 | 6,981,765 | 6,789,881 | 6,802,592 |
| 7,029,097 | 6,799,836 | 7,048,352 | 7,182,267 | 7,025,279 | 6,857,571 | 6,817,539 |
| 6,830,198 | 6,992,791 | 7,038,809 | 6,980,323 | 7,148,992 | 7,139,091 | 6,947,173 |
| 7,101,034 | 6,969,144 | 6,942,319 | 6,827,427 | 6,984,021 | 6,984,022 | 6,869,167 |
| 6,918,542 | 7,007,852 | 6,899,420 | 6,918,665 | 6,997,625 | 6,988,840 | 6,984,080 |
| 6,845,978 | 6,848,687 | 6,840,512 | 6,863,365 | 7,204,582 | 6,921,150 | 7,128,396 |
| 6,913,347 | 7,008,819 | 6,935,736 | 6,991,317 | 7,284,836 | 7,055,947 | 7,093,928 |
| 7,100,834 | 7,270,396 | 7,187,086 | 7,290,856 | 7,032,825 | 7,086,721 | 7,159,968 |
| 7,010,456 | 7,147,307 | 7,111,925 | 7,229,154 | 7,278,711 | 7,290,720 | 7,287,706 |
| 7,079,712 | 6,825,945 | 6,813,039 | 6,987,506 | 7,038,797 | 6,980,318 | 6,816,274 |
| 7,102,772 | 6,681,045 | 6,728,000 | 7,173,722 | 7,088,459 | 7,068,382 | 7,062,651 |
| 6,789,194 | 6,789,191 | 6,644,642 | 6,502,614 | 6,622,999 | 6,669,385 | 6,549,935 |
| 6,987,573 | 6,727,996 | 6,591,884 | 6,439,706 | 6,760,119 | 6,290,349 | 6,428,155 |
| 6,785,016 | 6,870,966 | 6,822,639 | 6,737,591 | 7,055,739 | 7,233,320 | 6,830,196 |
| 6,832,717 | 6,957,768 | 7,170,499 | 7,106,888 | 7,123,239 | 11/225,172 | 10/466,440 |
| 10/451,722 | 10/503,898 | 10/503,897 | 10/503,918 | 10/503,925 | 10/503,885 | 10/503,889 |
| 10/503,891 | 11/006,577 | 11/185,725 | 11/202,344 | 09/113,054 | 09/693,317 | 09/505,951 |
| 10/866,608 | 10/636,285 | 11/540,574 | 10/636,224 | 10/656,281 | 10/656,791 | 10/831,238 |

-continued

| | | | | | | |
|---|---|---|---|---|---|---|
| 10/831,237 | 10/831,239 | 10/831,240 | 10/831,241 | 10/853,336 | 10/853,659 | 11/012,024 |
| 11/011,925 | 11/635,524 | 11/442,400 | 11/003,404 | 11/003,419 | 11/003,699 | 11/071,473 |
| 11/003,463 | 11/003,683 | 11/003,614 | 10/753,440 | 10/803,078 | 10/922,843 | 11/513,386 |
| 10/815,637 | 10/815,647 | 10/815,620 | 11/041,650 | 11/041,651 | 11/041,649 | 11/041,610 |
| 11/480,957 | 11/144,844 | 11/635,533 | 11/696,144 | 10/636,227 | 10/636,247 | 10/990,382 |
| 11/305,158 | 11/033,145 | 10/913,373 | 10/913,374 | 10/913,380 | 10/913,379 | 10/407,212 |
| 10/683,064 | 10/884,889 | 10/922,890 | 10/922,885 | 10/922,889 | 10/922,884 | 10/922,879 |
| 10/922,887 | 10/922,888 | 10/922,874 | 10/922,871 | 10/922,882 | 10/922,883 | 10/922,878 |
| 11/491,378 | 11/293,796 | 11/124,199 | 11/124,192 | 11/124,163 | 11/124,149 | 11/124,152 |
| 11/124,185 | 11/124,201 | 11/124,191 | 11/124,159 | 11/124,170 | 11/124,148 | 11/124,168 |
| 11/124,167 | 11/228,481 | 11/228,485 | 11/228,483 | 11/228,532 | 11/228,480 | 11/737,726 |
| 11/242,916 | 11/144,799 | 10/965,772 | 11/107,799 | 11/442,180 | 11/643,845 | 10/296,534 |
| 10/534,813 | 10/534,881 | 10/534,815 | 11/246,690 | 10/760,233 | 10/760,246 | 10/760,255 |
| 10/760,209 | 10/760,194 | 10/760,232 | 11/454,904 | 11/601,756 | 10/728,783 | 10/728,803 |
| 10/773,183 | 10/773,186 | 10/773,184 | 11/060,751 | 11/603,825 | 11/097,308 | 11/544,778 |
| 11/084,806 | 09/575,197 | 09/575,186 | 09/607,843 | 09/693,690 | 09/575,181 | 09/722,174 |
| 10/291,523 | 10/291,471 | 10/291,481 | 10/291,576 | 10/291,592 | 10/291,542 | 10/291,821 |
| 10/685,523 | 10/804,034 | 10/793,933 | 10/944,044 | 10/943,877 | 10/981,626 | 10/981,616 |
| 11/026,045 | 11/059,696 | 11/051,032 | 11/059,674 | 11/082,827 | 11/202,253 | 11/203,200 |
| 11/227,239 | 11,739,014 | 10/913,350 | 11/331,109 | 10/949,307 | 11/149,160 | 11/206,756 |
| 10/778,056 | 10/917,466 | 11/281,671 | 11/754,370 | 10/291,718 | 10/492,152 | 10/492,168 |
| 10/683,151 | 10/510,391 | 10/778,090 | 11/074,782 | 11/188,016 | 11/072,529 | 11/155,545 |
| 11/144,813 | 11/707,946 | 11/730,776 | 11/066,161 | 11/066,159 | 11/066,158 | 11/650,536 |
| 10/727,181 | 10/727,162 | 10/727,245 | 10/727,180 | 10/727,179 | 10/727,164 | 10/727,198 |
| 10/754,938 | 11/488,853 | 10/296,522 | 10/884,881 | 10/854,522 | 10/854,488 | 10/854,503 |
| 10/854,495 | 10/854,498 | 10/854,512 | 10/854,525 | 10/854,526 | 10/854,505 | 10/854,493 |
| 10/854,528 | 10/854,520 | 10/854,499 | 10/854,518 | 10/854,517 | 10/636,216 | 10/853,143 |
| 11/225,158 | 11/442,132 | 11/544,768 | 10/760,202 | 10/760,198 | 10/760,249 | 10/760,264 |
| 10/760,192 | 10/760,203 | 10/760,205 | 10/760,206 | 10/760,267 | 10/760,270 | 10/760,271 |
| 11/014,747 | 11/014,760 | 11/014,762 | 11/014,756 | 11/014,736 | 11/014,759 | 11/014,758 |
| 11/014,737 | 11/014,735 | 11/014,719 | 11/014,749 | 11/014,769 | 11/014,729 | 11/014,733 |
| 11/014,755 | 11/014,765 | 11/014,766 | 11/014,740 | 11/014,744 | 11/014,768 | 11/599,312 |
| 11/442,177 | 11/706,305 | 11/706,966 | 11/014,728 | 10/760,215 | 10/760,266 | 10/760,260 |
| 10/760,241 | 10/962,413 | 10/962,428 | 10/962,426 | 10/962,409 | 10/962,417 | 10/962,403 |
| 11/474,267 | 11/223,262 | 11/223,018 | 11/014,730 | 10/982,804 | 10/982,817 | 10/986,813 |
| 10/986,785 | 10/986,788 | 10/992,747 | 10/992,828 | 11/013,881 | 11/248,429 | 11/298,633 |
| 11/604,316 | 11/713,660 | 09/900,160 | 10/510,096 | 11/202,235 | 10/780,624 | 10/791,792 |
| 11/048,748 | 11/583,939 | 10/959,049 | 11/330,057 | 11/525,860 | 10/636,258 | 10/729,151 |
| 10/729,157 | 10/683,006 | 11/123,009 | 11/281,444 | 11/544,577 | 11/604,321 | 11/655,987 |
| 11/650,541 | 11/203,188 | 11/203,173 | 10/846,562 | 10/846,649 | 10/846,627 | 11/505,849 |
| 11/635,489 | 11/604,319 | 11/744,214 | 11/744,218 | 11/748,490 | 09/575,197 | 09/575,186 |

BACKGROUND OF THE INVENTION

Many different types of printing have been invented, a large number of which are presently in use. The known forms of print have a variety of methods for marking the print media with a relevant marking media. Commonly used forms of printing include offset printing, laser printing and copying devices, dot matrix type impact printers, thermal paper printers, film recorders, thermal wax printers, dye sublimation printers and ink jet printers both of the drop on demand and continuous flow type. Each type of printer has its own advantages and problems when considering cost, speed, quality, reliability, simplicity of construction and operation etc.

In recent years, the field of ink jet printing, wherein each individual pixel of ink is derived from one or more ink nozzles has become increasingly popular primarily due to its inexpensive and versatile nature.

Many different techniques on ink jet printing have been invented. For a survey of the field, reference is made to an article by J Moore, "Non-Impact Printing: Introduction and Historical Perspective", Output Hard Copy Devices, Editors R Dubeck and S Sherr, pages 207-220 (1988).

Ink Jet printers themselves come in many different types. The utilization of a continuous stream of ink in ink jet printing appears to date back to at least 1929 wherein U.S. Pat. No. 1,941,001 by Hansell discloses a simple form of continuous stream electro-static ink jet printing.

U.S. Pat. No. 3,596,275 by Sweet also discloses a process of a continuous ink jet printing including the step wherein the ink jet stream is modulated by a high frequency electro-static field so as to cause drop separation. This technique is still utilized by several manufacturers including Elmjet and Scitex (see also U.S. Pat. No. 3,373,437 by Sweet et al)

Piezoelectric ink jet printers are also one form of commonly utilized ink jet printing device. Piezoelectric systems are disclosed by Kyser et. al. in U.S. Pat. No. 3,946,398 (1970) which utilizes a diaphragm mode of operation, by Zolten in U.S. Pat. No. 3,683,212 (1970) which discloses a squeeze mode of operation of a piezoelectric crystal, Stemme in U.S. Pat. No. 3,747,120 (1972) discloses a bend mode of piezoelectric operation, Howkins in U.S. Pat. No. 4,459,601 discloses a piezoelectric push mode actuation of the ink jet stream and Fischbeck in U.S. Pat. No. 4,584,590 which discloses a shear mode type of piezoelectric transducer element.

Recently, thermal inkjet printing has become an extremely popular form of ink jet printing. The ink jet printing techniques include those disclosed by Endo et al in GB 2007162 (1979) and Vaught et al in U.S. Pat. No. 4,490,728. Both the aforementioned references disclosed ink jet printing techniques that rely upon the activation of an electrothermal actuator which results in the creation of a bubble in a constricted space, such as a nozzle, which thereby causes the ejection of ink from an aperture connected to the confined space onto a relevant print media. Printing devices utilizing the electro-thermal actuator are manufactured by manufacturers such as Canon and Hewlett Packard.

As can be seen from the foregoing, many different types of printing technologies are available. Ideally, a printing technology should have a number of desirable attributes. These include inexpensive construction and operation, high speed operation, safe and continuous long term operation etc. Each technology may have its own advantages and disadvantages in the areas of cost, speed, quality, reliability, power usage, simplicity of construction operation, durability and consumables.

In the construction of any inkjet printing system, there are a considerable number of important factors which must be traded off against one another especially as large scale printheads are constructed, especially those of a pagewidth type. A number of these factors are outlined below.

Firstly, inkjet printheads are normally constructed utilizing micro-electromechanical systems (MEMS) techniques. As such, they tend to rely upon standard integrated circuit construction/fabrication techniques of depositing planar layers on a silicon wafer and etching certain portions of the planar layers. Within silicon circuit fabrication technology, certain techniques are better known than others. For example, the techniques associated with the creation of CMOS circuits are likely to be more readily used than those associated with the creation of exotic circuits including ferroelectrics, gallium arsenide etc. Hence, it is desirable, in any MEMS constructions, to utilize well proven semi-conductor fabrication techniques which do not require any “exotic” processes or materials. Of course, a certain degree of trade off will be undertaken in that if the advantages of using the exotic material far out weighs its disadvantages then it may become desirable to utilize the material anyway. However, if it is possible to achieve the same, or similar, properties using more common materials, the problems of exotic materials can be avoided.

A desirable characteristic of inkjet printheads would be a hydrophobic ink ejection face (“front face” or “nozzle face”), preferably in combination with hydrophilic nozzle chambers and ink supply channels. Hydrophilic nozzle chambers and ink supply channels provide a capillary action and are therefore optimal for priming and for re-supply of ink to nozzle chambers after each drop ejection. A hydrophobic front face minimizes the propensity for ink to flood across the front face of the printhead. With a hydrophobic front face, the aqueous inkjet ink is less likely to flood sideways out of the nozzle openings. Furthermore, any ink which does flood from nozzle openings is less likely to spread across the face and mix on the front face—they will instead form discrete spherical microdroplets which can be managed more easily by suitable maintenance operations.

However, whilst hydrophobic front faces and hydrophilic ink chambers are desirable, there is a major problem in fabricating such printheads by MEMS techniques. The final stage of MEMS printhead fabrication is typically ashing of photoresist using an oxidizing plasma, such as an oxygen plasma. However, organic, hydrophobic materials deposited onto the front face are typically removed by the ashing process to leave a hydrophilic surface. Moreover, a problem with post-ashing vapour deposition of hydrophobic materials is that the hydrophobic material will be deposited inside nozzle chambers as well as on the front face of the printhead. The nozzle chamber walls become hydrophobized, which is highly undesirable in terms of generating a positive ink pressure biased towards the nozzle chambers. This is a conundrum, which creates significant demands on printhead fabrication.

Accordingly, it would be desirable to provide a printhead fabrication process, in which the resultant printhead has improved surface characteristics, without comprising the surface characteristics of nozzle chambers. It would further be desirable to provide a printhead fabrication process, in which the resultant printhead has a hydrophobic front face in combination with hydrophilic nozzle chambers.

SUMMARY OF THE INVENTION

In a first aspect the present invention provides a method of fabricating a printhead having a hydrophobic ink ejection face, the method comprising the steps of:

(a) providing a partially-fabricated printhead comprising a plurality of nozzle chambers and a nozzle plate having a relatively hydrophilic nozzle surface, said nozzle surface at least partially defining the ink ejection face of the printhead;

(b) depositing a hydrophobic polymeric layer onto the nozzle surface;

(c) depositing a protective metal film onto at least said polymeric layer;

(d) depositing a sacrificial material onto said polymeric layer;

(e) patterning said sacrificial material to define a plurality of nozzle opening regions;

(f) defining a plurality of nozzle openings through said metal film, said polymeric layer and said nozzle plate;

(g) subjecting said printhead to an oxidizing plasma, said metal film protecting said polymeric layer from said oxidizing plasma; and (h) removing said protective metal film, thereby providing a printhead having a relatively hydrophobic ink ejection face.

Optionally, said protective metal film is comprised of a metal selected from the group comprising: titanium and aluminium.

Optionally, said protective metal film has a thickness in the range of 10 nm to 1000 nm.

Optionally, step (f) is performed by sequential etching steps.

Optionally, a first metal-etching step is followed immediately by a second etching step for removing polymeric material and nozzle plate material.

Optionally, said second etching step is a dry etch employing a gas chemistry comprising $O_2$ and a fluorinated etching gas.

Optionally, said fluorinated etching gas is selected from the group comprising: $CF_4$ and $SF_6$.

Optionally, step (h) is performed by wet or dry etching.

Optionally, step (h) is performed by a wet rinse using peroxide or HF.

Optionally, all plasma oxidizing steps are performed prior to removing said protective metal film in step (h).

Optionally, backside MEMS processing steps are performed prior to removing said protective metal film in step (h).

Optionally, said backside MEMS processing steps include defining ink supply channels from a backside of said wafer, said backside being an opposite face to said ink ejection face.

Optionally, in said partially-fabricated printhead, a roof of each nozzle chamber is supported by a sacrificial photoresist scaffold, said method further comprising the step of oxidatively removing said photoresist scaffold prior to removing said protective metal film.

Optionally, said photoresist scaffold is removed using an oxygen ashing plasma.

Optionally, a roof of each nozzle chamber is defined at least partially by said nozzle plate.

Optionally, said nozzle plate is spaced apart from a substrate, such that sidewalls of each nozzle chamber extend between said nozzle plate and said substrate.

Optionally, said hydrophobic polymeric layer is comprised of a polymeric material selected from the group comprising: polymerized siloxanes and fluorinated polyolefins.

Optionally, said polymeric material is selected from the group comprising: polydimethylsiloxane (PDMS) and perfluorinated polyethylene (PFPE).

Optionally, said nozzle plate is comprised of a material selected from the group comprising: silicon nitride; silicon oxide and silicon oxynitride.

Optionally, said sacrificial material is photoresist.

BRIEF DESCRIPTION OF THE DRAWINGS

Optional embodiments of the present invention will now be described by way of example only with reference to the accompanying drawings, in which.

DESCRIPTION OF OPTIONAL EMBODIMENTS

The present invention may be used with any type of printhead. The present Applicant has previously described a plethora of inkjet printheads. It is not necessary to describe all such printheads here for an understanding of the present invention. However, the present invention will now be described in connection with a thermal bubble-forming inkjet printhead and a mechanical thermal bend actuated inkjet printhead. Advantages of the present invention will be readily apparent from the discussion that follows.

Thermal Bubble-Forming Inkjet Printhead

Figure 1:
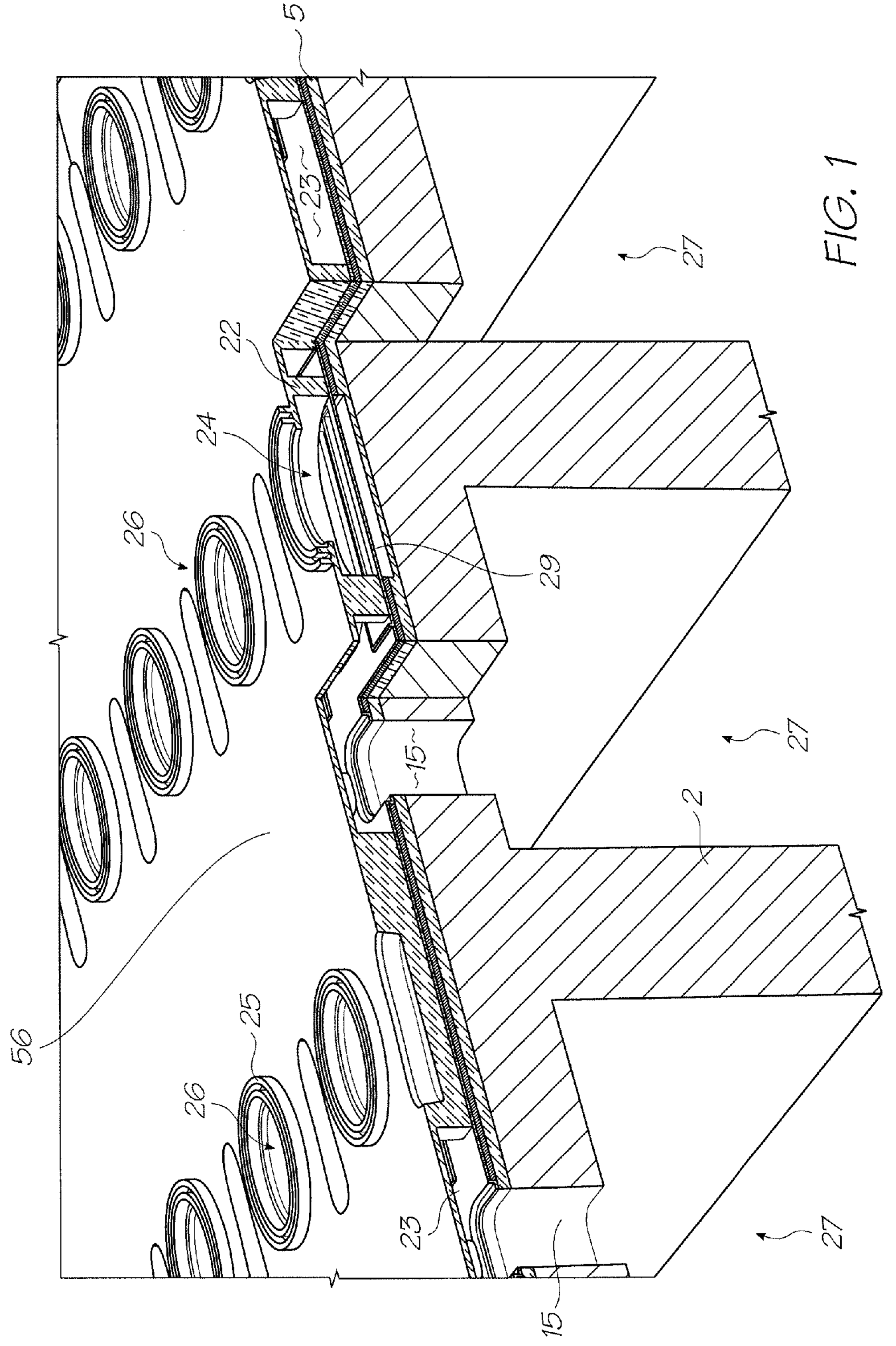
FIG. 1 is a partial perspective view of an array of nozzle assemblies of a thermal inkjet printhead.
Figure 2:
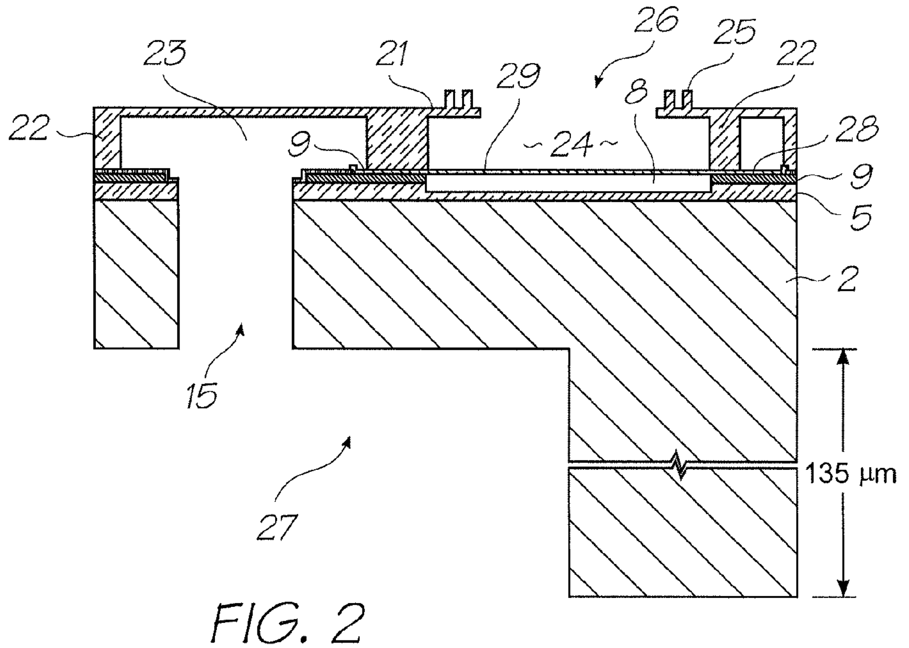
FIG. 2 is a side view of a nozzle assembly unit cell shown in FIG. 1.
Figure 3:
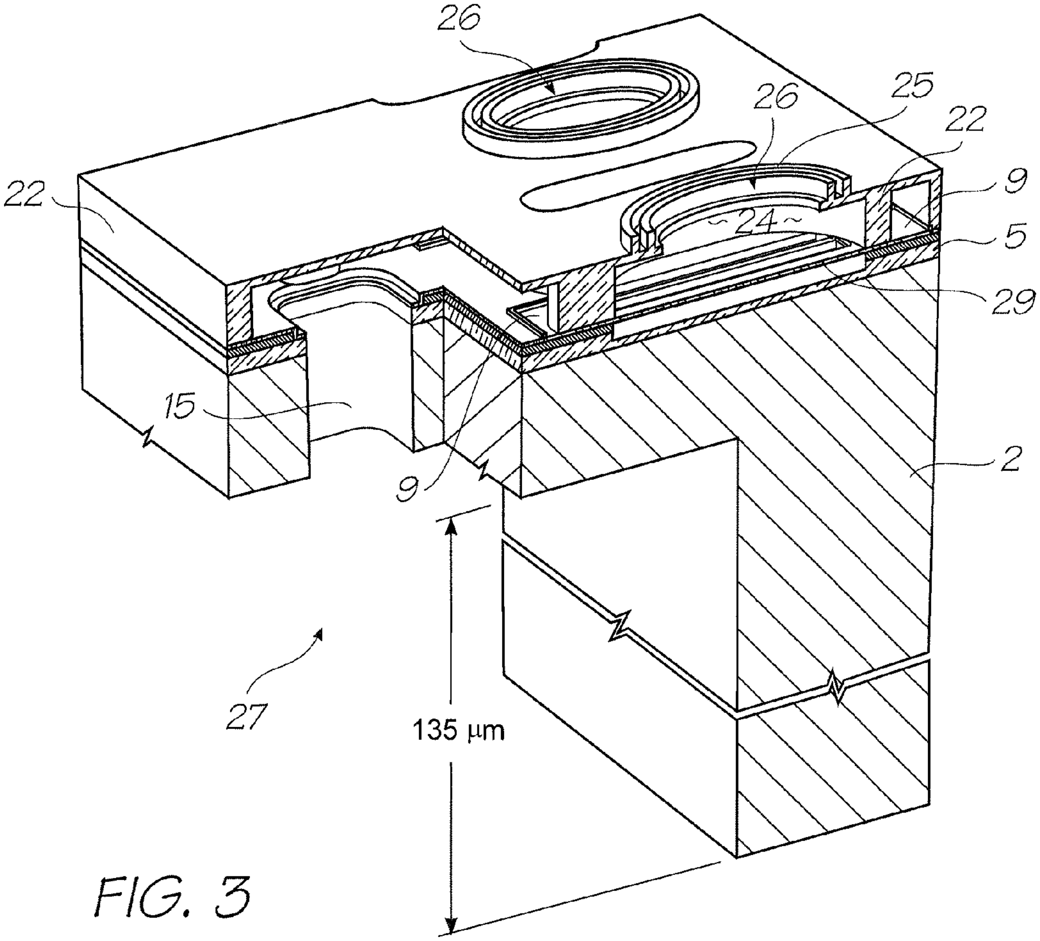
FIG. 3 is a perspective of the nozzle assembly shown in FIG. 2.

Referring to FIG. 1, there is shown a part of printhead comprising a plurality of nozzle assemblies. FIGS. 2 and 3 show one of these nozzle assemblies in side-section and cutaway perspective views.

Each nozzle assembly comprises a nozzle chamber 24 formed by MEMS fabrication techniques on a silicon wafer substrate 2. The nozzle chamber 24 is defined by a roof 21 and sidewalls 22 which extend from the roof 21 to the silicon substrate 2. As shown in FIG. 1, each roof is defined by part of a nozzle surface 56, which spans across an ejection face of the printhead. The nozzle surface 56 and sidewalls 22 are formed of the same material, which is deposited by PECVD over a sacrificial scaffold of photoresist during MEMS fabrication. Typically, the nozzle surface 56 and sidewalls 22 are formed of a ceramic material, such as silicon dioxide or silicon nitride. These hard materials have excellent properties for printhead robustness, and their inherently hydrophilic nature is advantageous for supplying ink to the nozzle chambers 24 by capillary action. However, the exterior (ink ejection) surface of the nozzle surface 56 is also hydrophilic, which causes any flooded ink on the surface to spread.

Returning to the details of the nozzle chamber 24, it will be seen that a nozzle opening 26 is defined in a roof of each nozzle chamber 24. Each nozzle opening 26 is generally elliptical and has an associated nozzle rim 25. The nozzle rim 25 assists with drop directionality during printing as well as reducing, at least to some extent, ink flooding from the nozzle opening 26. The actuator for ejecting ink from the nozzle chamber 24 is a heater element 29 positioned beneath the nozzle opening 26 and suspended across a pit 8. Current is supplied to the heater element 29 via electrodes 9 connected to drive circuitry in underlying CMOS layers 5 of the substrate 2. When a current is passed through the heater element 29, it rapidly superheats surrounding ink to form a gas bubble, which forces ink through the nozzle opening. By suspending the heater element 29, it is completely immersed in ink when the nozzle chamber 24 is primed. This improves printhead efficiency, because less heat dissipates into the underlying substrate 2 and more input energy is used to generate a bubble.

As seen most clearly in FIG. 1, the nozzles are arranged in rows and an ink supply channel 27 extending longitudinally along the row supplies ink to each nozzle in the row. The ink supply channel 27 delivers ink to an ink inlet passage 15 for each nozzle, which supplies ink from the side of the nozzle opening 26 via an ink conduit 23 in the nozzle chamber 24.

The MEMS fabrication process for manufacturing such printheads was described in detail in our previously filed U.S. application Ser. No. 11/246,684 filed on Oct. 11, 2005, the contents of which is herein incorporated by reference. The latter stages of this fabrication process are briefly revisited here for the sake of clarity.

Figure 4:
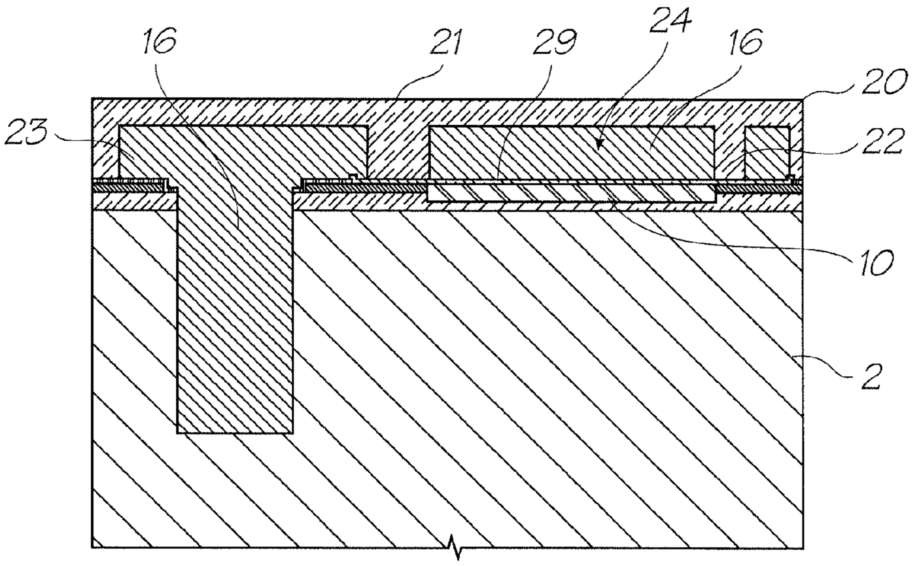
FIG. 4 shows a partially-formed nozzle assembly after deposition of side walls and roof material onto a sacrificial photoresist layer.
Figure 5:
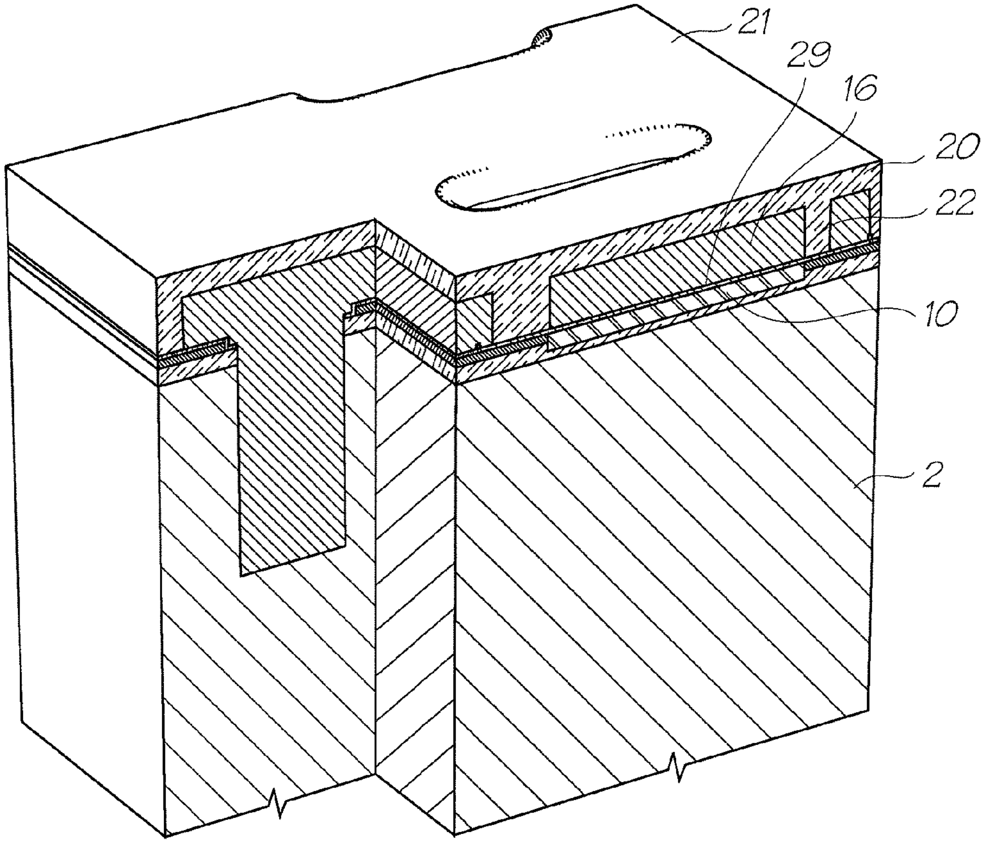
FIG. 5 is a perspective of the nozzle assembly shown in FIG. 4.

FIGS. 4 and 5 show a partially-fabricated printhead comprising a nozzle chamber 24 encapsulating sacrificial photoresist 10 ("SAC1") and 16 ("SAC2"). The SAC1 photoresist 10 was used as a scaffold for deposition of heater material to form the suspended heater element 29. The SAC2 photoresist 16 was used as a scaffold for deposition of the sidewalls 22 and roof 21 (which defines part of the nozzle surface 56).

Figure 6:
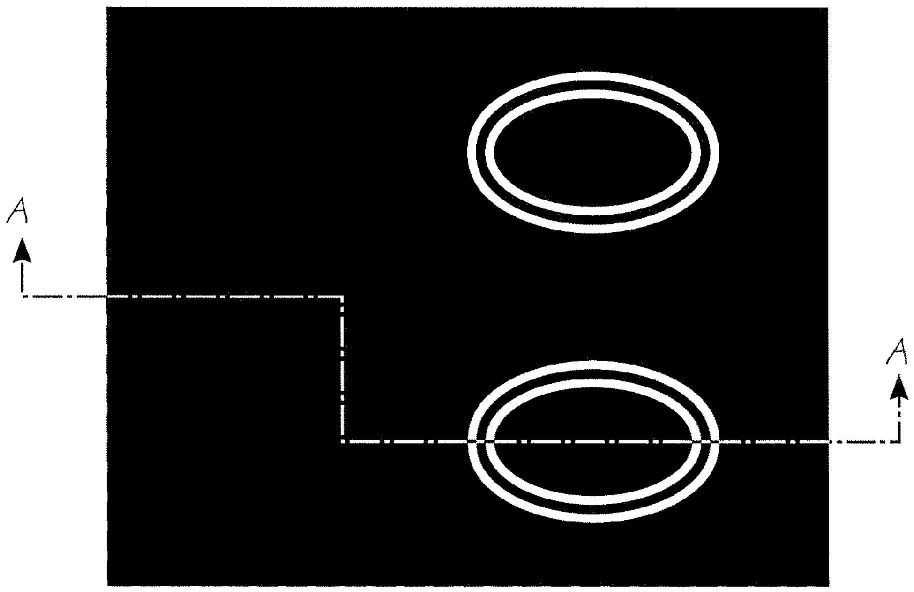
FIG. 6 is the mask associated with the nozzle rim etch shown in FIG. 7.
Figure 7:
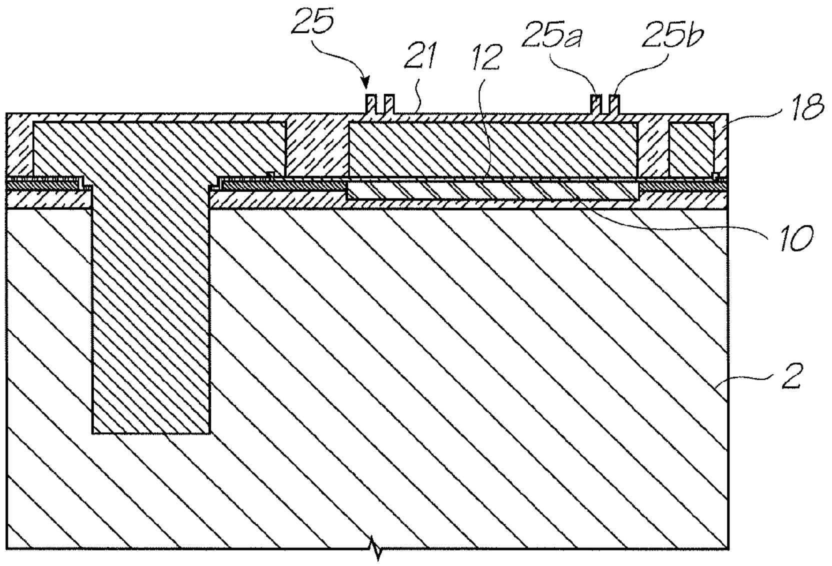
FIG. 7 shows the etch of the roof layer to form the nozzle opening rim.
Figure 8:
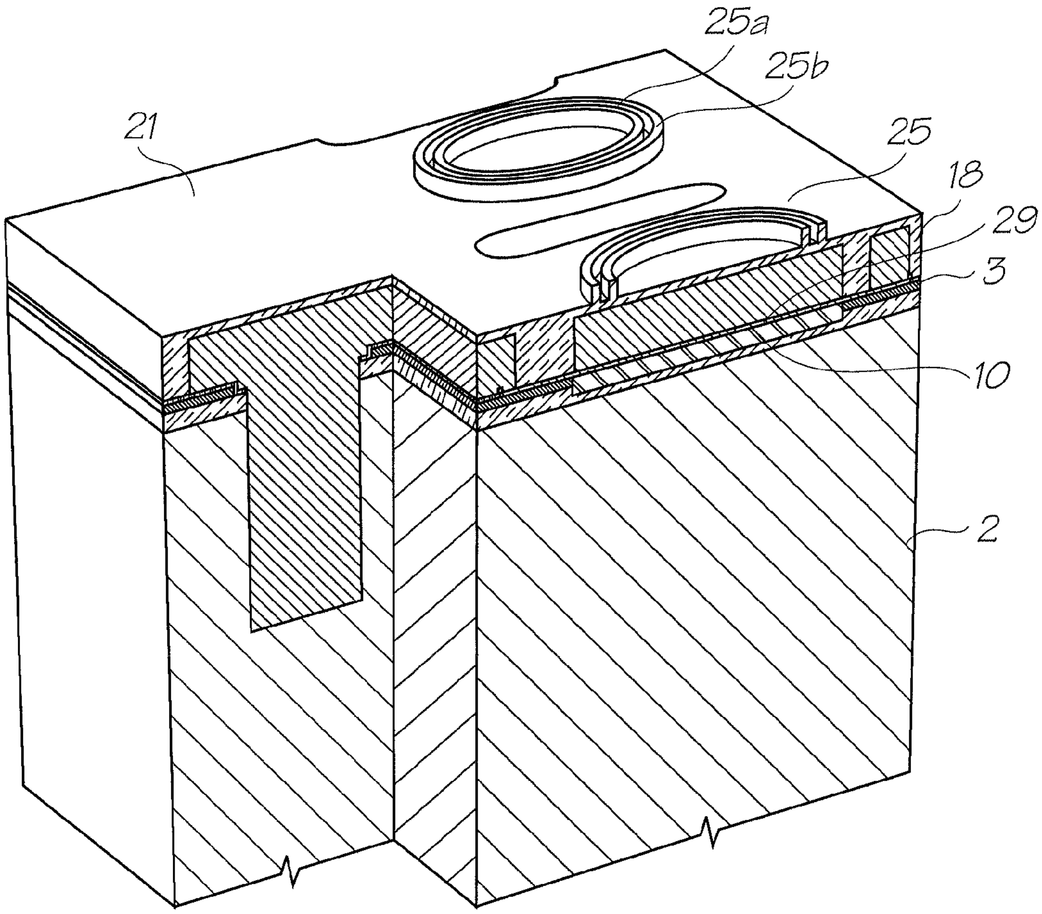
FIG. 8 is a perspective of the nozzle assembly shown in FIG. 7.

In the prior art process, and referring to FIGS. 6 to 8, the next stage of MEMS fabrication defines the elliptical nozzle rim 25 in the roof 21 by etching away 2 microns of roof material 20. This etch is defined using a layer of photoresist (not shown) exposed by the dark tone rim mask shown in FIG. 6. The elliptical rim 25 comprises two coaxial rim lips 25*a* and 25*b*, positioned over their respective thermal actuator 29.

Figure 9:
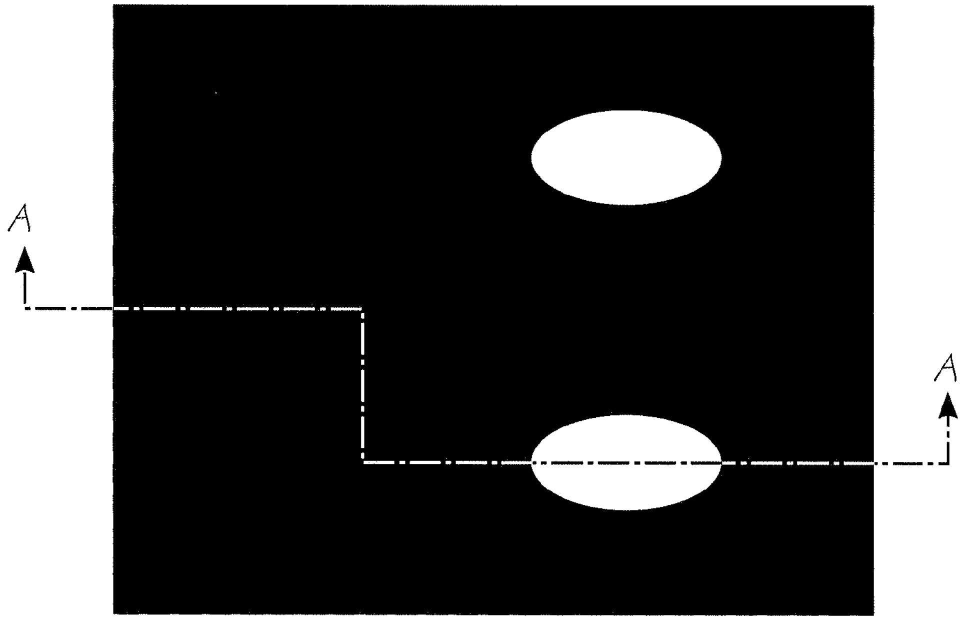
FIG. 9 is the mask associated with the nozzle opening etch shown in FIG. 10.
Figure 10:
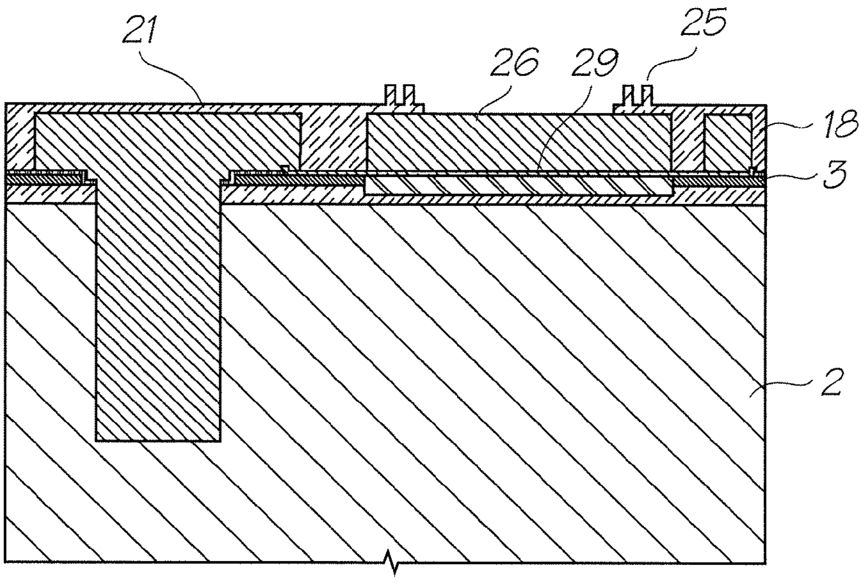
FIG. 10 shows the etch of the roof material to form the elliptical nozzle openings.
Figure 11:
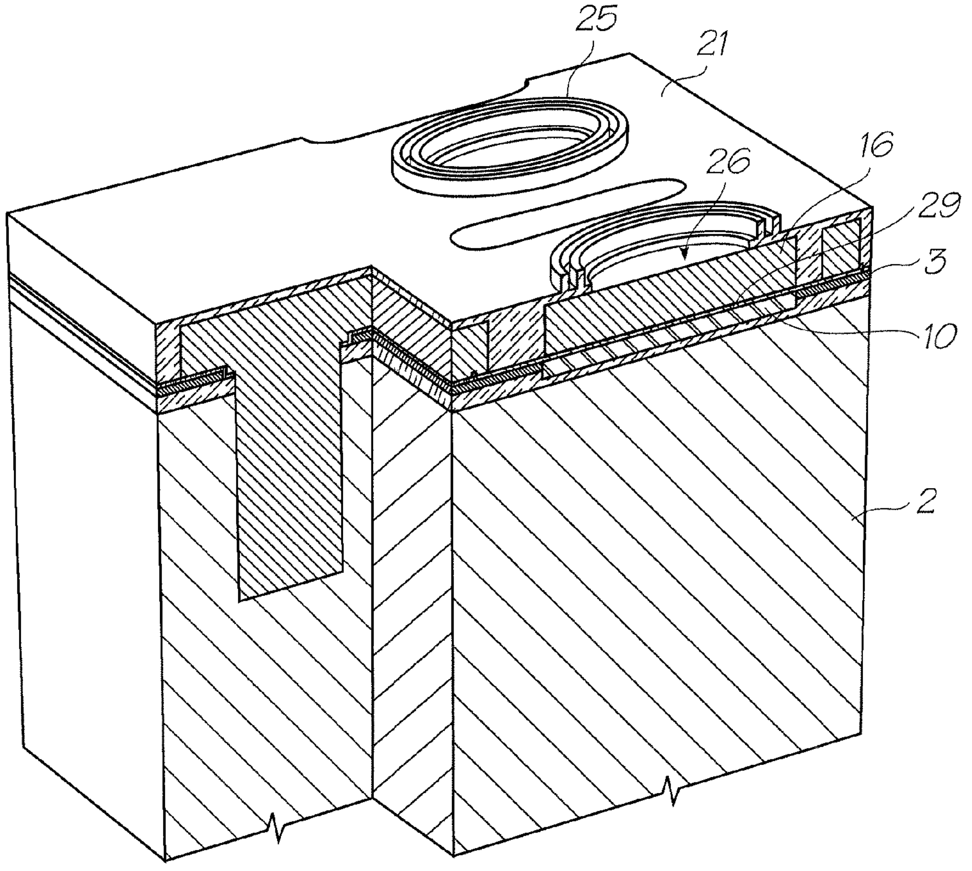
FIG. 11 is a perspective of the nozzle assembly shown in FIG. 10.

Referring to FIGS. 9 to 11, the next stage defines an elliptical nozzle aperture 26 in the roof 21 by etching all the way through the remaining roof material, which is bounded by the rim 25. This etch is defined using a layer of photoresist (not shown) exposed by the dark tone roof mask shown in FIG. 9. The elliptical nozzle aperture 26 is positioned over the thermal actuator 29, as shown in FIG. 11.

Figure 12:
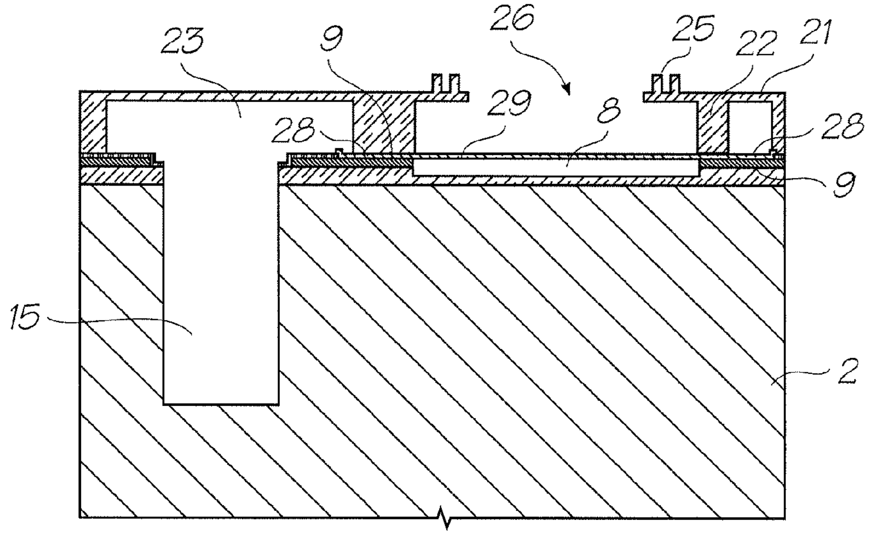
FIG. 12 shows the oxygen plasma ashing of the first and second sacrificial layers.
Figure 13:
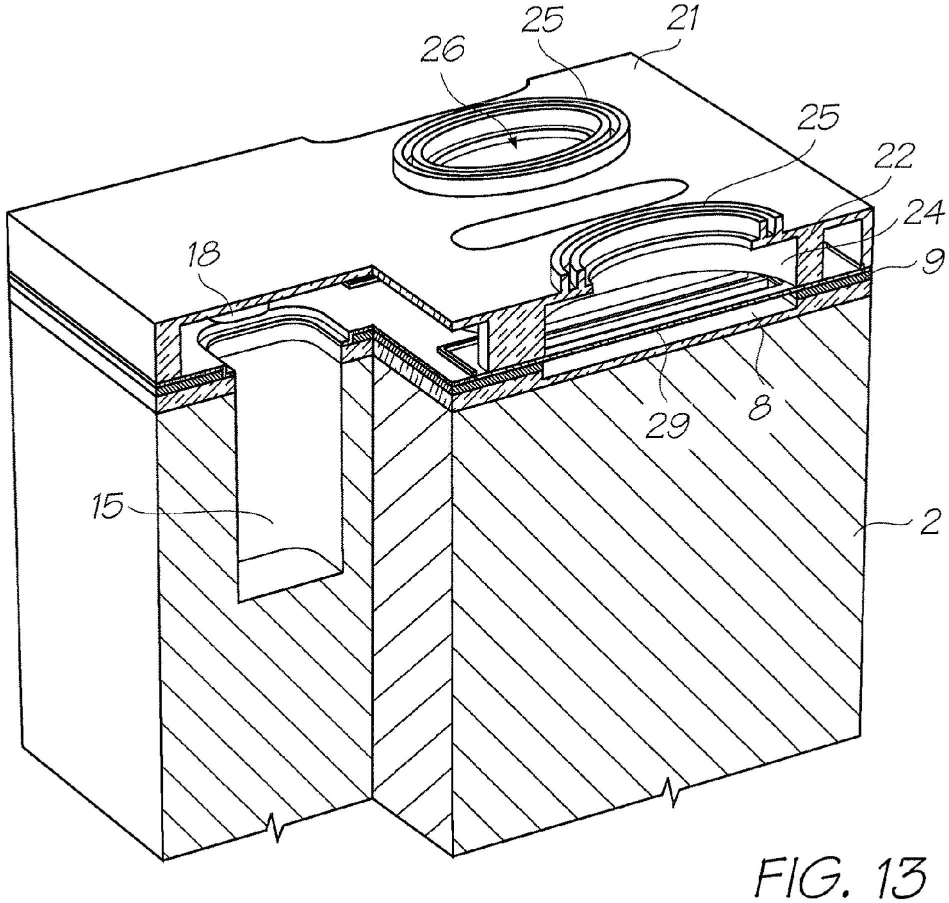
FIG. 13 is a perspective of the nozzle assembly shown in FIG. 12.
Figure 14:
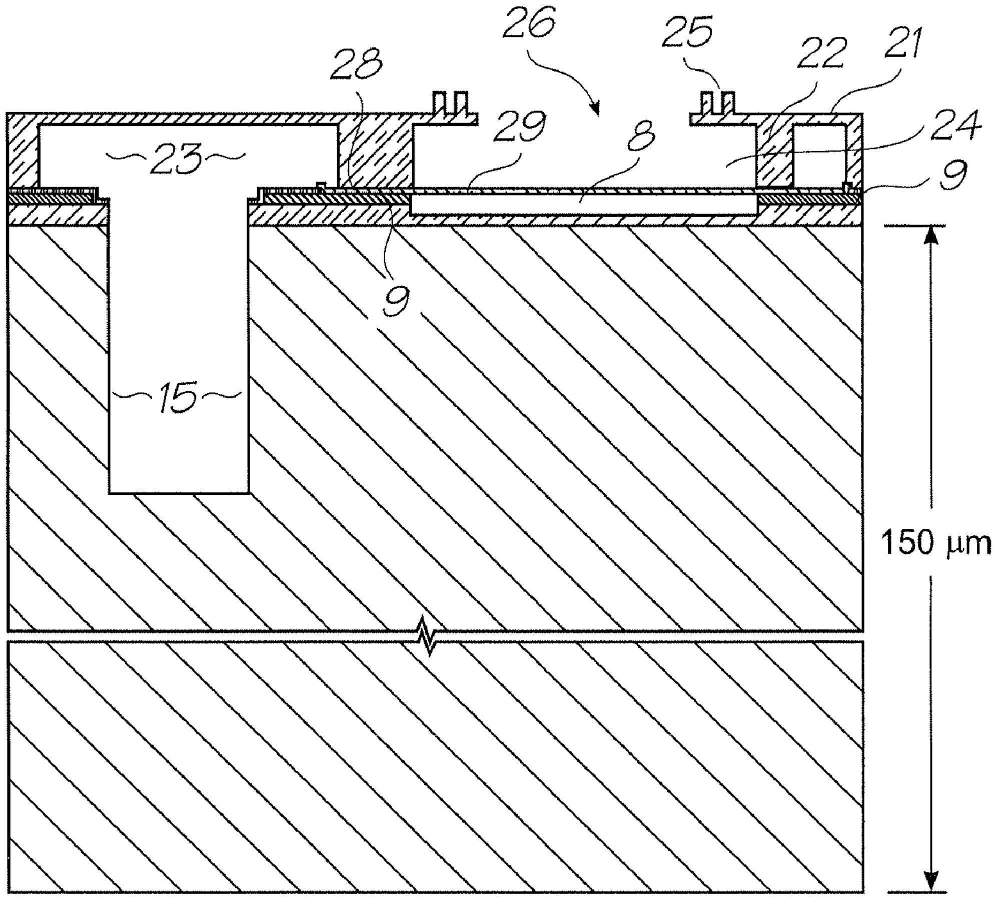
FIG. 14 shows the nozzle assembly after the ashing, as well as the opposing side of the wafer.
Figure 15:
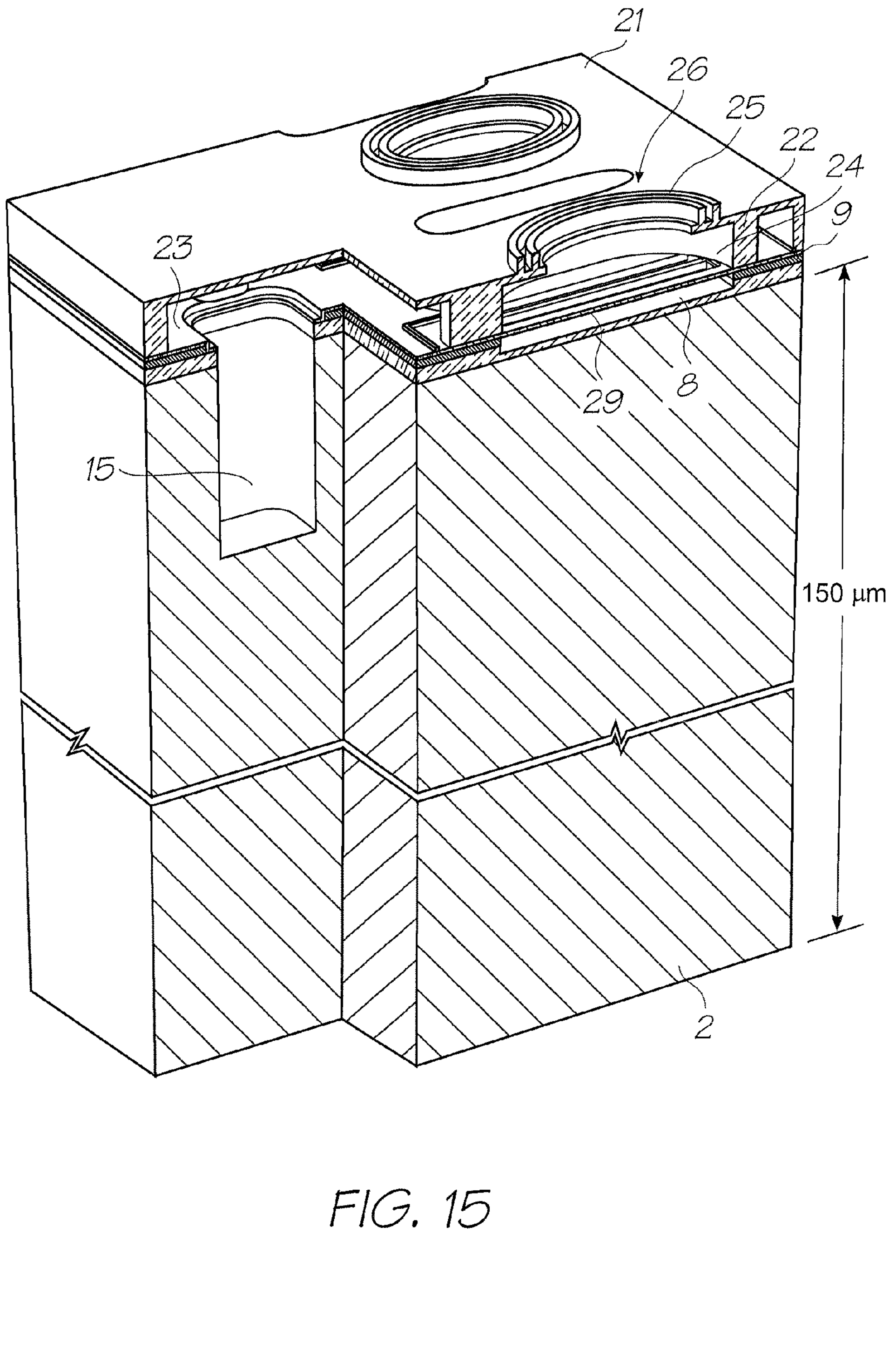
FIG. 15 is a perspective of the nozzle assembly shown in FIG. 14.

With all the MEMS nozzle features now fully formed, the next stage removes the SAC 1 and SAC2 photoresist layers 10 and 16 by $O_2$ plasma ashing (FIGS. 12 and 13). FIGS. 14 and 15 show the entire thickness (150 microns) of the silicon wafer 2 after ashing the SAC1 and SAC2 photoresist layers 10 and 16.

Figure 16:
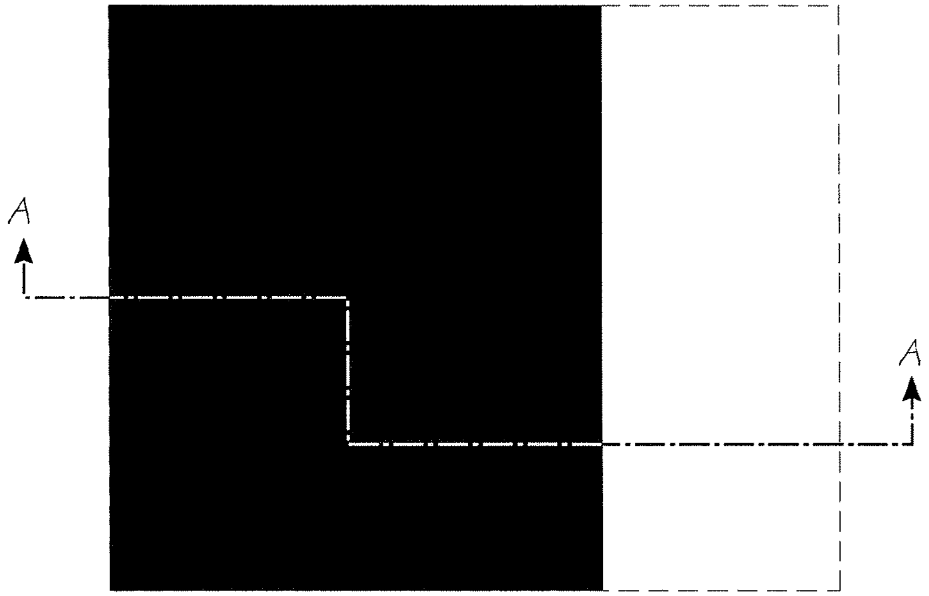
FIG. 16 is the mask associated with the backside etch shown in FIG. 17.
Figure 17:
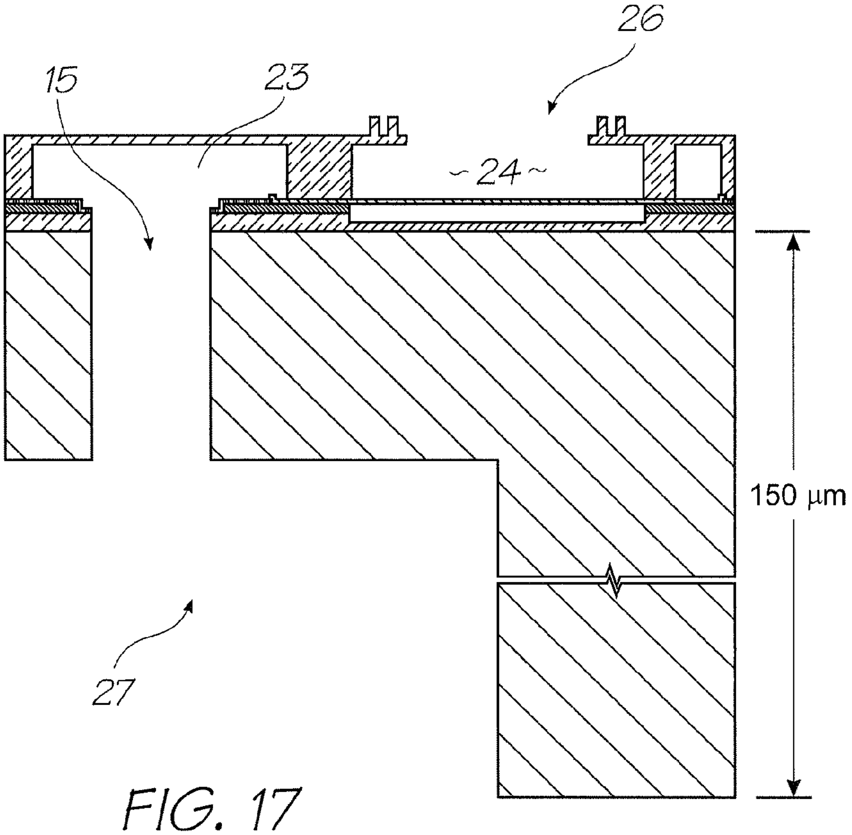
FIG. 17 shows the backside etch of the ink supply channel into the wafer.
Figure 18:
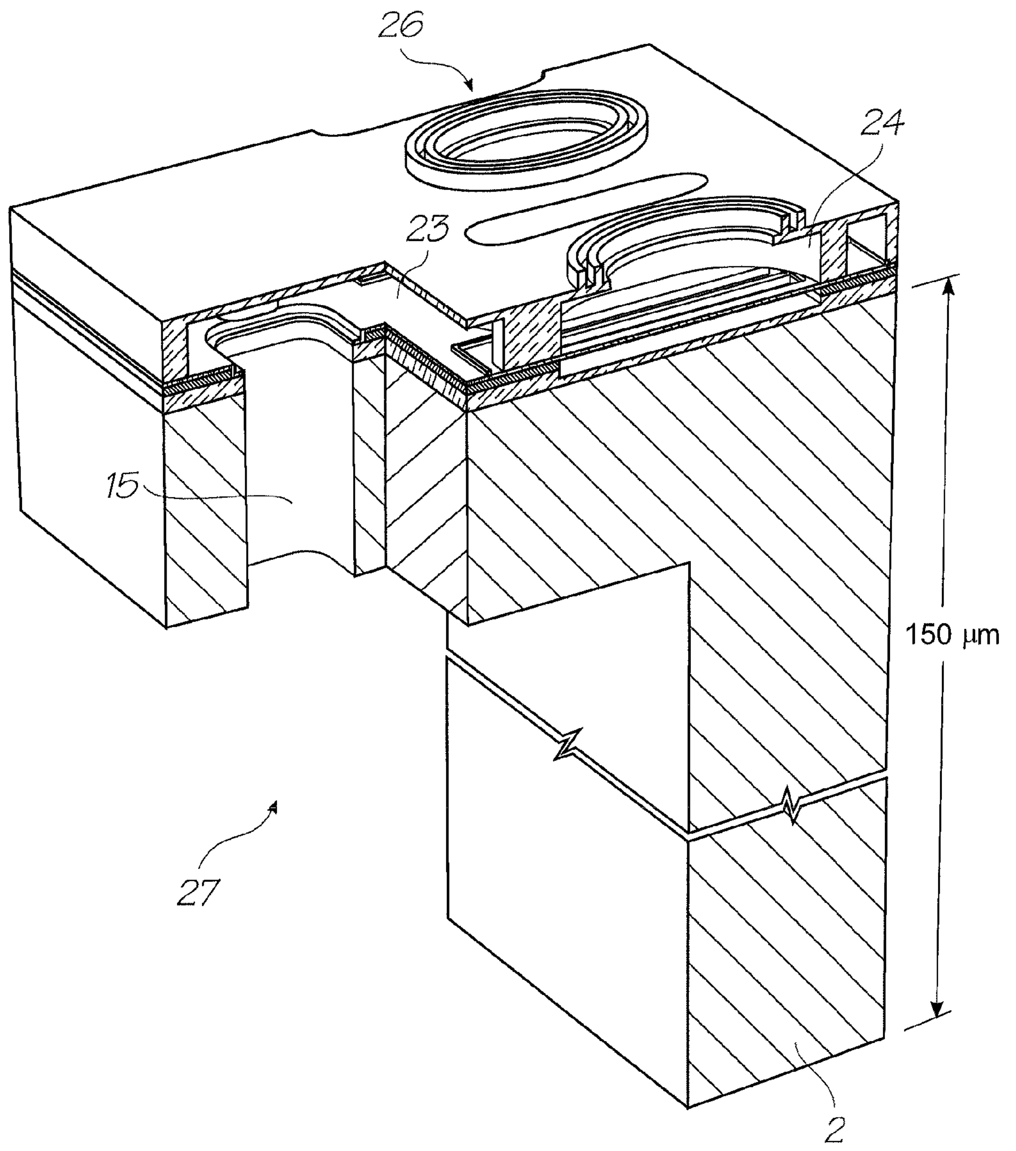
FIG. 18 is a perspective of the nozzle assembly shown in FIG. 17.

Referring to FIGS. 16 to 18, once frontside MEMS processing of the wafer is completed, ink supply channels 27 are etched from the backside of the wafer to meet with the ink inlets 15 using a standard anisotropic DRIE. This backside etch is defined using a layer of photoresist (not shown) exposed by the dark tone mask shown in FIG. 16. The ink supply channel 27 makes a fluidic connection between the backside of the wafer and the ink inlets 15.

Finally, and referring to FIGS. 2 and 3, the wafer is thinned to about 135 microns by backside etching. FIG. 1 shows three adjacent rows of nozzles in a cutaway perspective view of a completed printhead integrated circuit. Each row of nozzles has a respective ink supply channel 27 extending along its length and supplying ink to a plurality of ink inlets 15 in each row. The ink inlets, in turn, supply ink to the ink conduit 23 for each row, with each nozzle chamber receiving ink from a common ink conduit for that row.

As already discussed above, this prior art MEMS fabrication process inevitably leaves a hydrophilic ink ejection face by virtue of the nozzle surface 56 being formed of ceramic materials, such as silicon dioxide, silicon nitride, silicon oxynitride, aluminium nitride etc.

Nozzle Etch Followed by Hydrophobic Polymer Coating

As an alternative to the process described above, the nozzle surface 56 has a hydrophobic polymer deposited thereon immediately after the nozzle opening etch (i.e. at the stage represented in FIGS. 10 and 11). Since the photoresist scaffold layers must be subsequently removed, the polymeric material should be resistant to the ashing process. Preferably, the polymeric material should be resistant to removal by an $O_2$ or an $H_2$ ashing plasma. The Applicant has identified a family of polymeric materials which meet the above-mentioned requirements of being hydrophobic whilst at the same time being resistant to $O_2$ or $H_2$ ashing. These materials are typically polymerized siloxanes or fluorinated polyolefins. More specifically, polydimethylsiloxane (PDMS) and perfluorinated polyethylene (PFPE) have both been shown to be particularly advantageous. Such materials form a passivating surface oxide in an $O_2$ plasma, and subsequently recover their hydrophobicity relatively quickly. A further advantage of these materials is that they have excellent adhesion to ceramics, such as silicon dioxide and silicon nitride. A further advantage of these materials is that they are photopatternable, which makes them particularly suitable for use in a MEMS process. For example, PDMS is curable with UV light, whereby unexposed regions of PDMS can be removed relatively easily.

Figure 19:
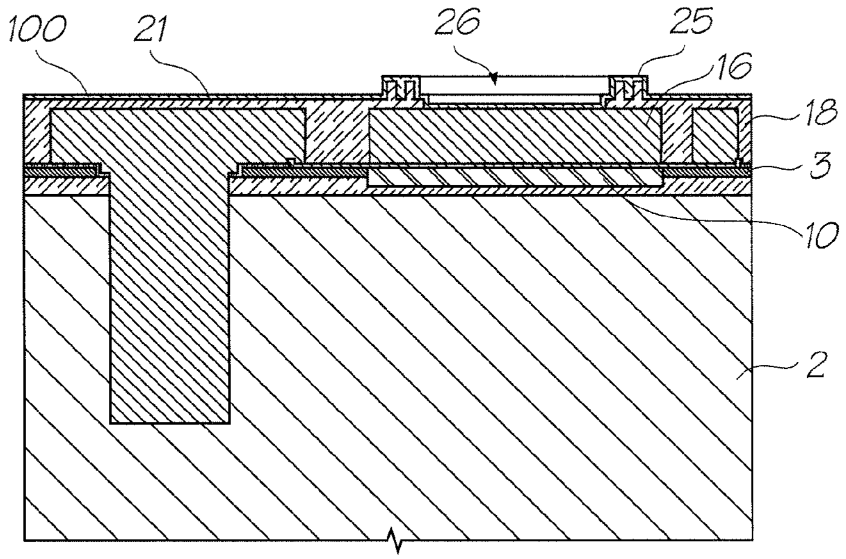
FIG. 19 shows the nozzle assembly of FIG. 10 after deposition of a hydrophobic polymeric coating.
Figure 20:
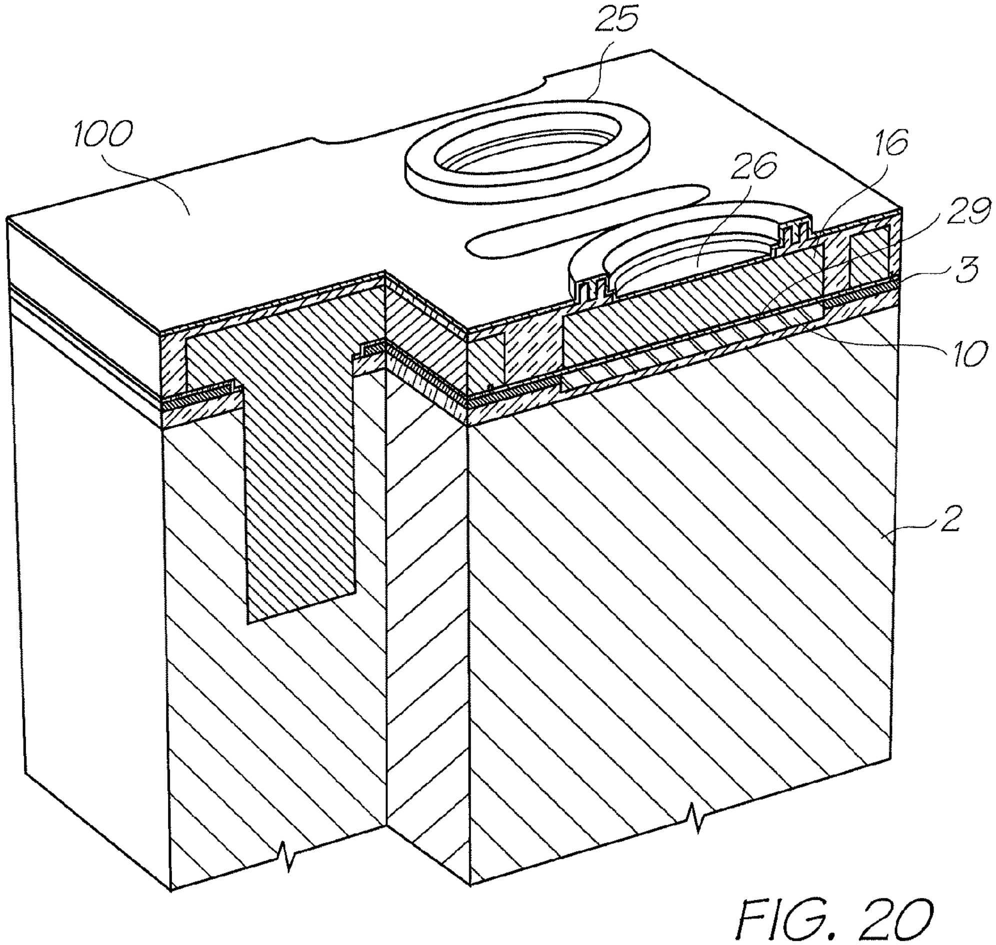
FIG. 20 is a perspective of the nozzle assembly shown in FIG. 19.

Referring to FIG. 10, there is shown a nozzle assembly of a partially-fabricated printhead after the rim and nozzle etches described earlier. However, instead of proceeding with SAC1 and SAC2 ashing (as shown in FIGS. 12 and 13), at this stage a thin layer (ca 1 micron) of hydrophobic polymeric material 100 is spun onto the nozzle surface 56, as shown in FIGS. 19 and 20.

Figure 21:
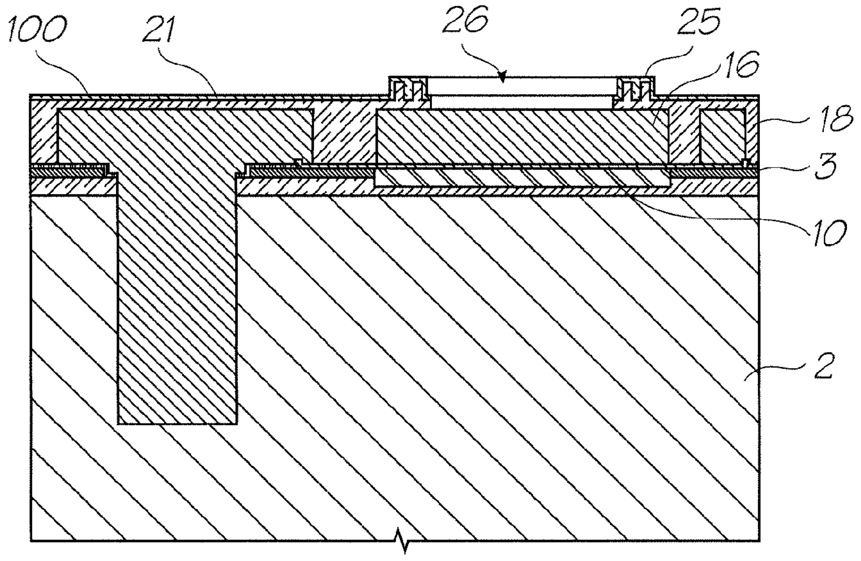
FIG. 21 shows the nozzle assembly of FIG. 19 after photopatterning of the polymeric coating.
Figure 22:
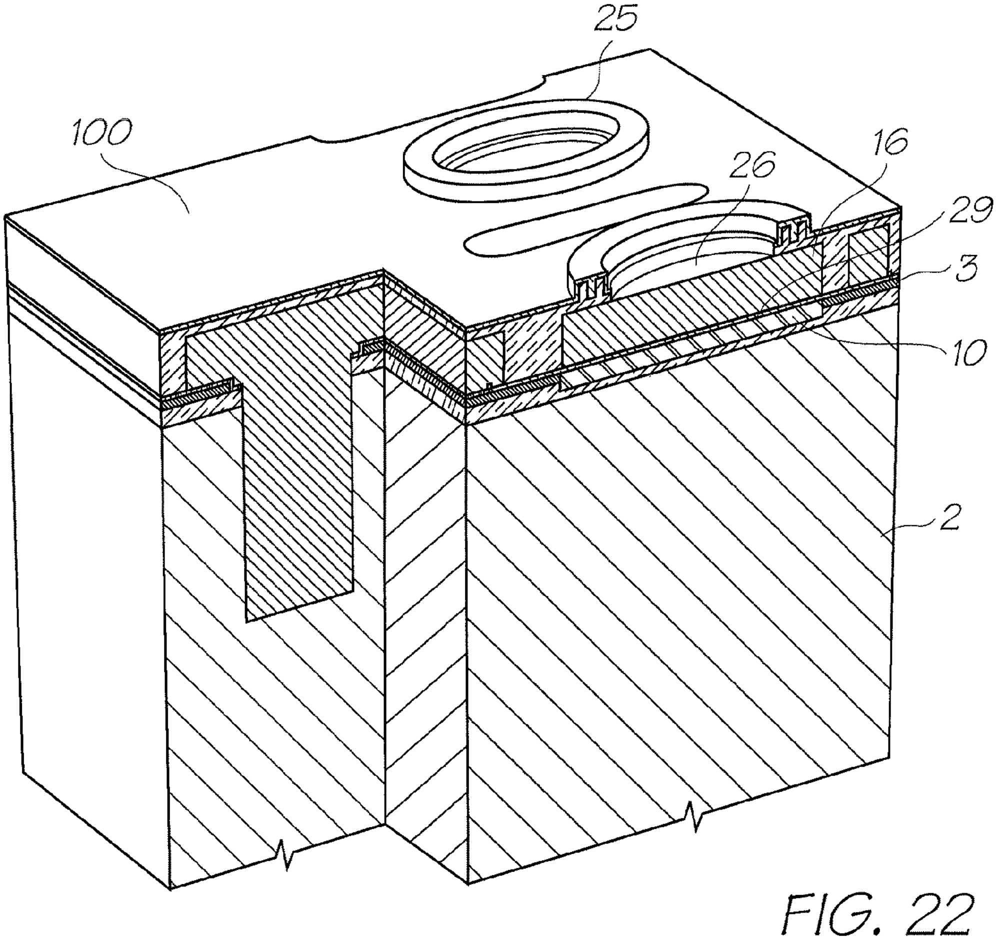
FIG. 22 is a perspective of the nozzle assembly shown in FIG. 21.

After deposition, this layer of polymeric material is photopatterned so as to remove the material deposited within the nozzle openings 26. Photopatterning may comprise exposure of the polymeric layer 100 to UV light, except for those regions within the nozzle openings 26. Accordingly, as shown in FIGS. 21 and 22, the printhead now has a hydrophobic nozzle surface, and subsequent MEMS processing steps can proceed analogously to the steps described in connection with FIGS. 12 to 18. Significantly, the hydrophobic polymer 100 is not removed by the $O_2$ ashing steps used to remove the photoresist scaffold 10 and 16.

Hydrophobic Polymer Coating Prior to Nozzle Etch with Polymer Used as Etch Mask

As an alternative process, the hydrophobic polymer layer 100 is deposited immediately after the stage represented by FIGS. 7 and 8. Accordingly, the hydrophobic polymer is spun onto the nozzle surface after the rim 25 is defined by the rim etch, but before the nozzle opening 26 is defined by the nozzle etch.

Figure 23:
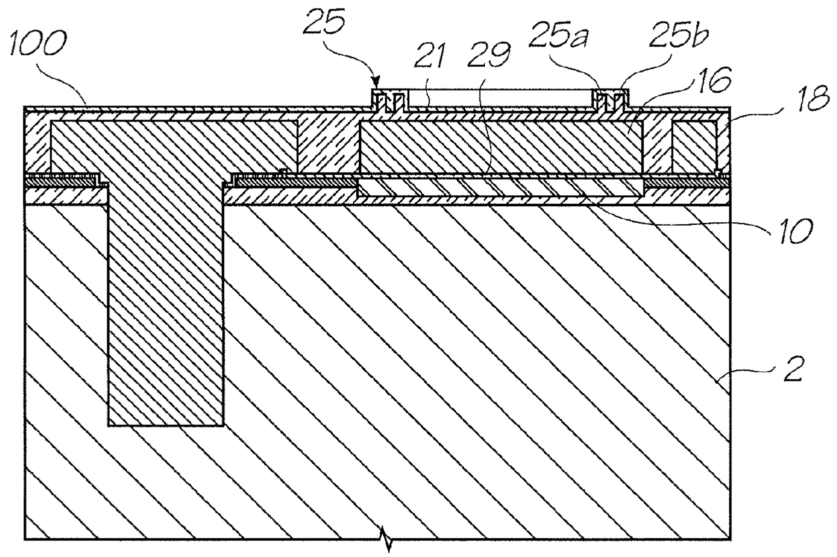
FIG. 23 shows the nozzle assembly of FIG. 7 after deposition of a hydrophobic polymeric coating.
Figure 24:
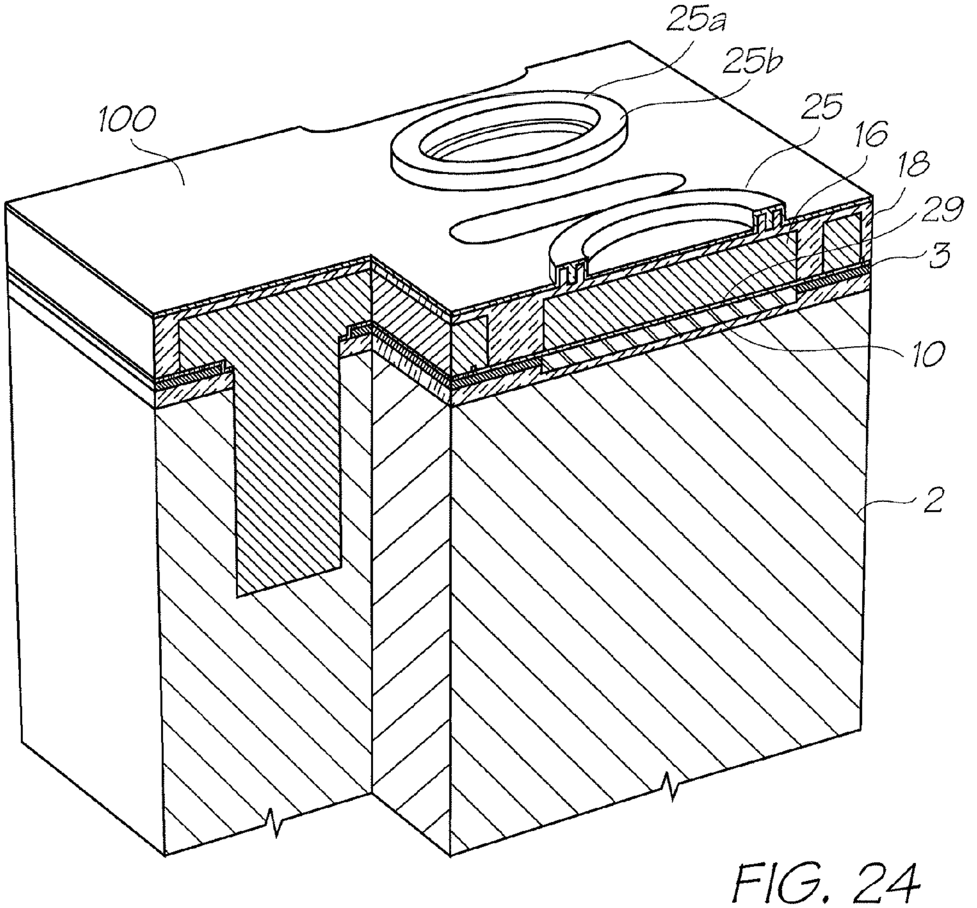
FIG. 24 is a perspective of the nozzle assembly shown in FIG. 23.

Referring to FIGS. 23 and 24, there is shown a nozzle assembly after deposition of the hydrophobic polymer 100.

Figure 25:
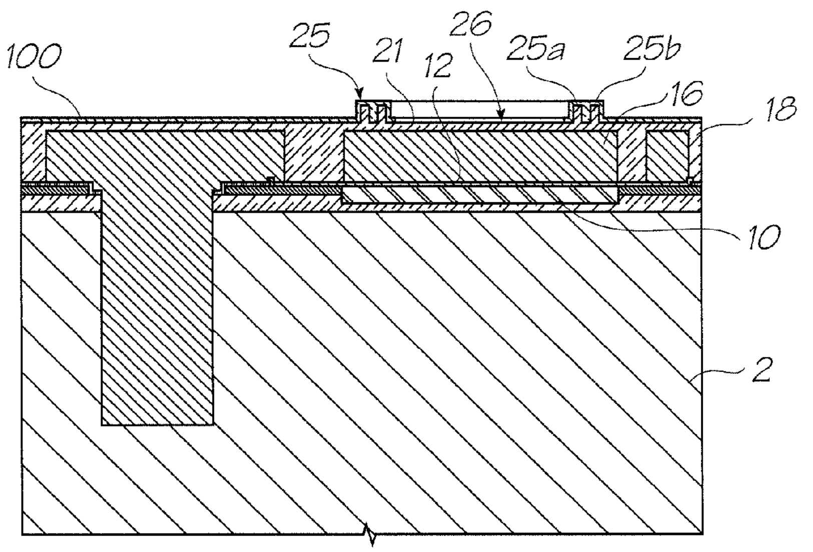
FIG. 25 shows the nozzle assembly of FIG. 23 after photopatterning of the polymeric coating.
Figure 26:
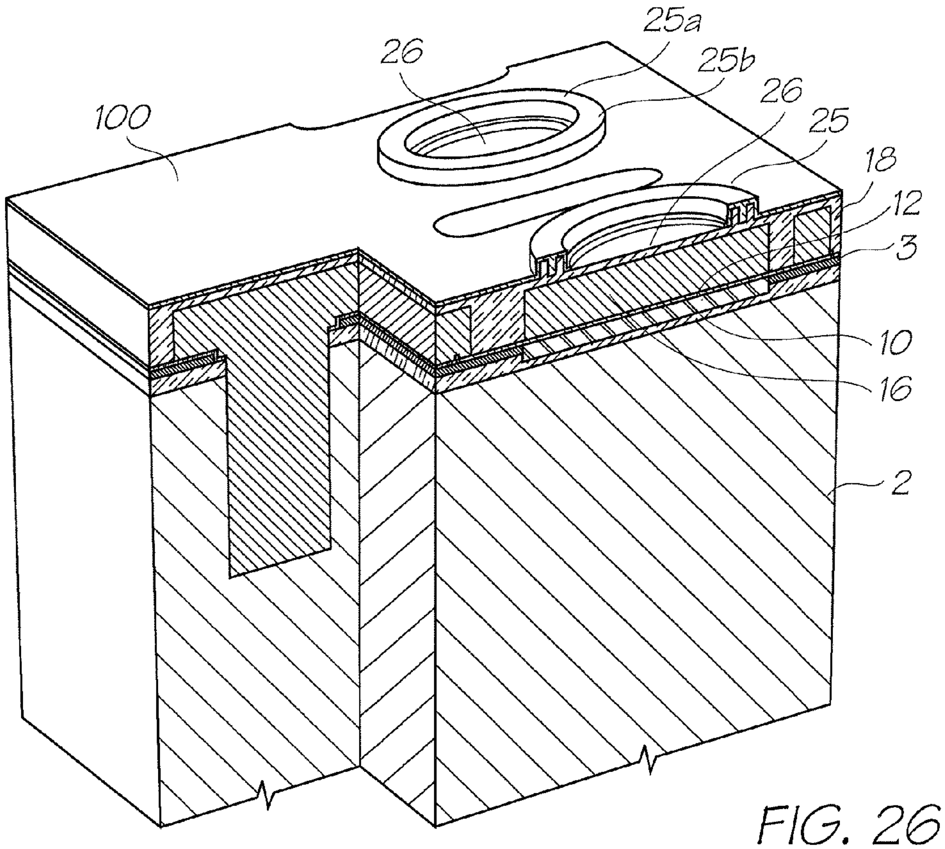
FIG. 26 is a perspective of the nozzle assembly shown in FIG. 25.

The polymer 100 is then photopatterned so as to remove the material bounded by the rim 25 in the nozzle opening region, as shown in FIGS. 25 and 26. Hence, the hydrophobic polymeric material 100 can now act as an etch mask for etching the nozzle opening 26.

The nozzle opening 26 is defined by etching through the roof structure 21, which is typically performed using a gas chemistry comprising $O_2$ and a fluorinated hydrocarbon (e.g. $CF_4$ or $C_4F_8$). Hydrophobic polymers, such as PDMS and PFPE, are normally etched under the same conditions. However, since materials such as silicon nitride etch much more rapidly, the roof 21 can be etched selectively using either PDMS or PFPE as an etch mask. By way of comparison, with a gas ratio of 3:1 ($CF_4$:$O_2$), silicon nitride etches at about 240 microns per hour, whereas PDMS etches at about 20 microns per hour. Hence, it will be appreciated that etch selectivity using a PDMS mask is achievable when defining the nozzle opening 26.

Once the roof 21 is etched to define the nozzle opening, the nozzle assembly 24 is as shown in FIGS. 21 and 22. Accordingly, subsequent MEMS processing steps can proceed analogously to the steps described in connection with FIGS. 12 to 18. Significantly, the hydrophobic polymer 100 is not removed by the $O_2$ ashing steps used to remove the photoresist scaffold 10 and 16.

Hydrophobic Polymer Coating Prior to Nozzle Etch with Additional Photoresist Mask FIGS. 25 and 26 illustrate how the hydrophobic polymer 100 may be used as an etch mask for a nozzle opening etch. Typically, different etch rates between the polymer 100 and the roof 21, as discussed above, provides sufficient etch selectivity.

However, as a further alternative and particularly to accommodate situations where there is insufficient etch selectivity, a layer of photoresist (not shown) may be deposited over the hydrophobic polymer 100 shown in FIG. 24, which enables conventional downstream MEMS processing. Having photopatterned this top layer of resist, the hydrophobic polymer 100 and the roof 21 may be etched in one step using the same gas chemistry, with the top layer of a photoresist being used as a standard etch mask. A gas chemistry of, for example, $CF_4$/$O_2$ first etches through the hydrophobic polymer 100 and then through the roof 21.

Subsequent $O_2$ ashing may be used to remove just the top layer of photoresist (to obtain the nozzle assembly shown in FIGS. 10 and 11), or prolonged $O_2$ ashing may be used to remove both the top layer of photoresist and the sacrificial photoresist layers 10 and 16 (to obtain the nozzle assembly shown in FIGS. 12 and 13).

The skilled person will be able to envisage other alternative sequences of MEMS processing steps, in addition to the three alternatives discussed herein. However, it will be appreciated that in identifying hydrophobic polymers capable of withstanding $O_2$ and $H_2$ ashing, the present inventors have provided a viable means for providing a hydrophobic nozzle surface in an inkjet printhead fabrication process.

Metal Film for Protecting Hydrophobic Polymer Layer

We have described hereinabove three alternative modifications of a printhead fabrication process which result in the ink ejection face of a printhead being defined by a hydrophobic polymer layer.

As already described above, the modification relies on the resistance of certain polymeric materials to standard ashing conditions using, for example, an oxygen plasma. This characteristic of certain polymers allows final ashing steps to be performed without removing the hydrophobic coating on the nozzle plate. However, there remains the possibility of such materials being imperfectly resistant to ashing, particularly aggressive ashing conditions that are typical of final-stage MEMS processing of printheads. Furthermore, there is the possibility that some hydrophobic polymers do not fully recover their hydrophobicity after ashing, which is undesirable given that the purpose of modifying the printhead fabrication process is to maximize the hydrophobicity of the ink ejection face.

It would therefore be desirable to provide an improved process, whereby hydrophobic polymers that are imperfectly resistant to ashing may still be used to hydrophobize an ink ejection face of a printhead. This would expand the range of materials available for use in hydrophobizing printheads. It would further be desirable to maximize the hydrophobicity of the ink ejection face without relying on hydrophobic materials recovering their hydrophobicity post-ashing.

In an improved hydrophobizing modification, the hydrophobic polymeric layer is protected with a thin metal film e.g. titanium or aluminium. The thin metal film protects the hydrophobic layer from late-stage oxygen ashing conditions, and is removed in a final post-ashing step, typically using a peroxide or acid rinse e.g. $H_2O_2$ or HF rinse. An advantage of this process is that the polymer used for hydrophobizing the ink ejection face is not exposed to aggressive ashing conditions and retains its hydrophobic characteristics throughout the MEMS processing steps.

It will be appreciated that the metal film may be used to protect the hydrophobic polymer layer in any of the three alternatives described above for hydrophobizing the printhead. By way of example, the process outlined in connection with FIGS. 19 to 22 will now be described with a protective metal film modification.

Referring then to FIGS. 19 to 22, printhead fabrication proceeds exactly as detailed in these drawings. In other words, a thin layer (ca 1 micron) of hydrophobic polymeric material 100 is spun onto the nozzle surface 56, as shown in FIGS. 19 and 20. After deposition, this layer of polymeric material is photopatterned so as to remove the material deposited within the nozzle openings 26. Photopatterning may comprise exposure of the polymeric layer 100 to UV light, except for those regions within the nozzle openings 26. Accordingly, as shown in FIGS. 21 and 22, the printhead now has a hydrophobic nozzle surface with no hydrophobic material positioned within the nozzle openings 26.

Figure 36:
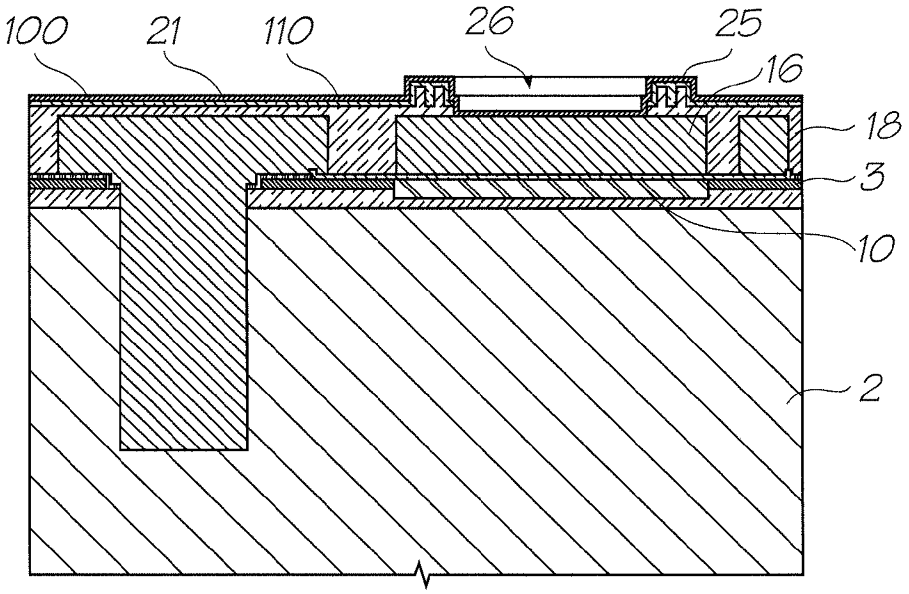
FIG. 36 shows the nozzle assembly of FIG. 21 after deposition of a protective metal film.

Turning to FIG. 36, the next stage comprises deposition of a thin film (ca 100 nm) of metal 110 onto the polymeric layer 100. After deposition, the metal may be removed from within the nozzle opening 26 by standard metal etch techniques. For example, a conventional photoresist layer (not shown) may be exposed and developed, as appropriate, and used as an etch mask for etching the metal film 110. Any suitable etch may be used, such as RIE using a chlorine-based gas chemistry.

Figure 37:
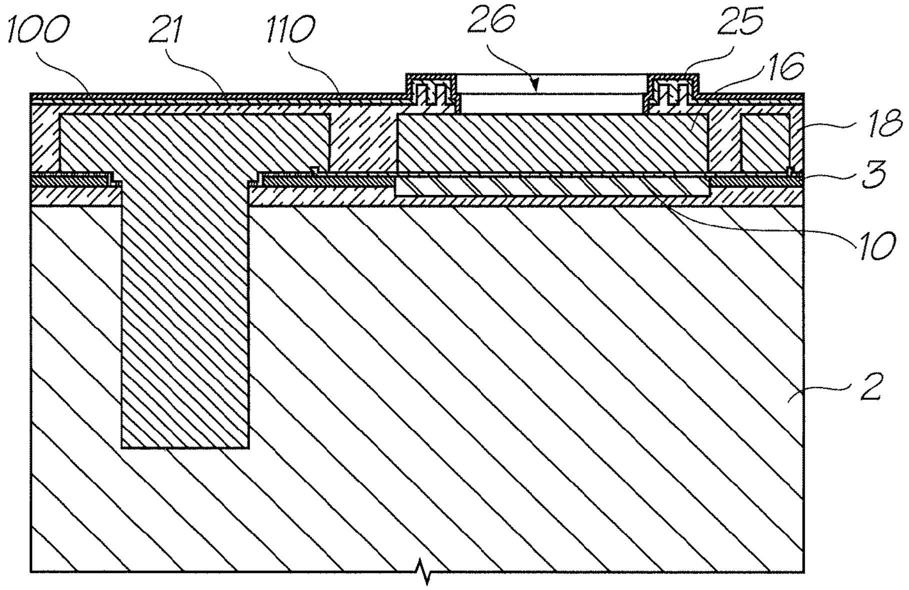
FIG. 37 shows the nozzle assembly of FIG. 36 after removal a the metal film from within the nozzle opening.

FIG. 37 shows the partially-fabricated printhead after etching the metal film 110. It will be seen that the hydrophobic polymer layer 100 is completely encapsulated by the metal film 110 and therefore protected from any aggressive late-stage ashing.

Subsequent MEMS processing steps can proceed analogously to the steps described in connection with FIGS. 12 to 18. Significantly, the hydrophobic polymer 100 is not removed by the $O_2$ ashing steps used to remove the photoresist scaffold 10 and 16, because it is protected by the metal film 110.

After $O_2$ ashing, the metal film is removed by a brief $H_2O_2$ or HF rinse, thereby revealing the hydrophobic polymer layer 100 in the completed printhead.

FIGS. 10 to 13 show frontside ashing of the wafer to remove all photoresist from within the nozzle chambers. In this case, it is of course necessary to define openings in the protective metal layer 110 so that the oxygen plasma can access the photoresist.

Figure 38:
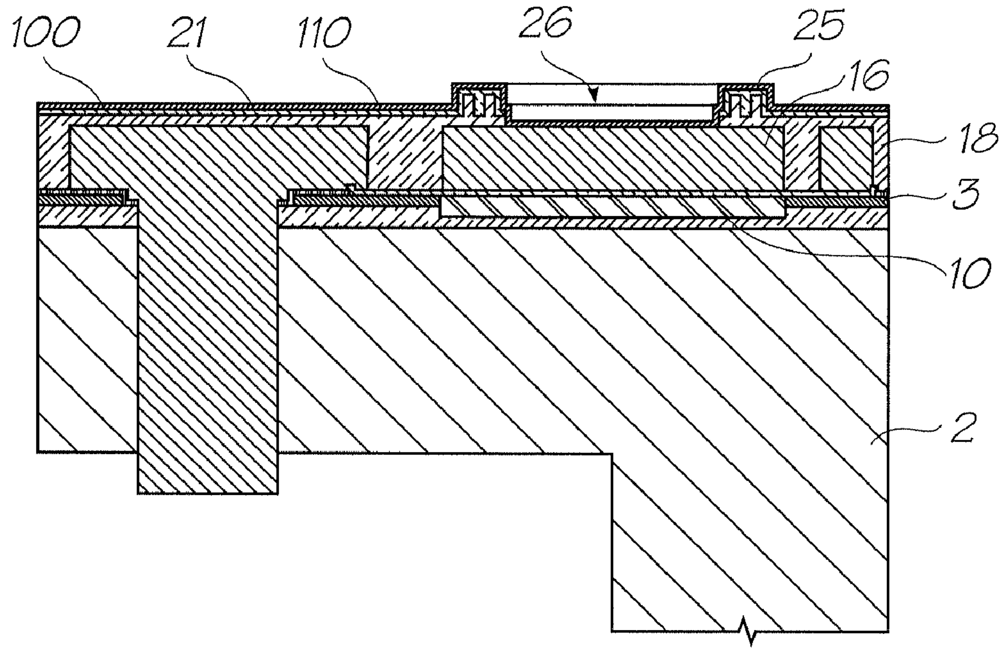
FIG. 38 shows the nozzle assembly of FIG. 36 after backside MEMS processing to define an ink supply channel.

FIG. 38 exemplifies an alternative sequence of MEMS processing steps, which makes use of backside ashing and avoids defining openings in the protective metal layer 110. The wafer shown in FIG. 36 is subjected to backside MEMS processing so as to define ink supply channels 27 from the backside of the wafer. The resultant wafer is shown in FIG. 38. Once ink supply channels 27 are defined from the backside, then backside ashing can be performed to remove all frontside photoresist, including the scaffolds 10 and 16. The hydrophobic polymer layer 100 still enjoys protection from the ashing plasma. With the photoresist removed, the protective metal film 110 can simply be rinsed off with $H_2O_2$ or HF to provide the wafer shown in FIG. 17, except with a hydrophobic polymer layer covering the nozzle plate.

Metal Film Protection with Minimal Number of MEMS Processing Steps

In an alternative sequence of steps, metal film protection of the polymer layer 100 is performed prior to the nozzle opening etch. In this scenario, the metal film 110, the polymer layer 100 and the nozzle roof may be etched in simultaneous or sequential etching steps, using a top conventional photoresist layer as a common mask for each etch.

Starting from the wafer shown in FIG. 23, the metal film 110 is deposited onto the polymer layer 100 immediately after the nozzle rim etch and before any nozzle opening etches. The resultant wafer is shown in FIG. 39 with the metal film 110 covering the polymer layer 100.

Figure 40:
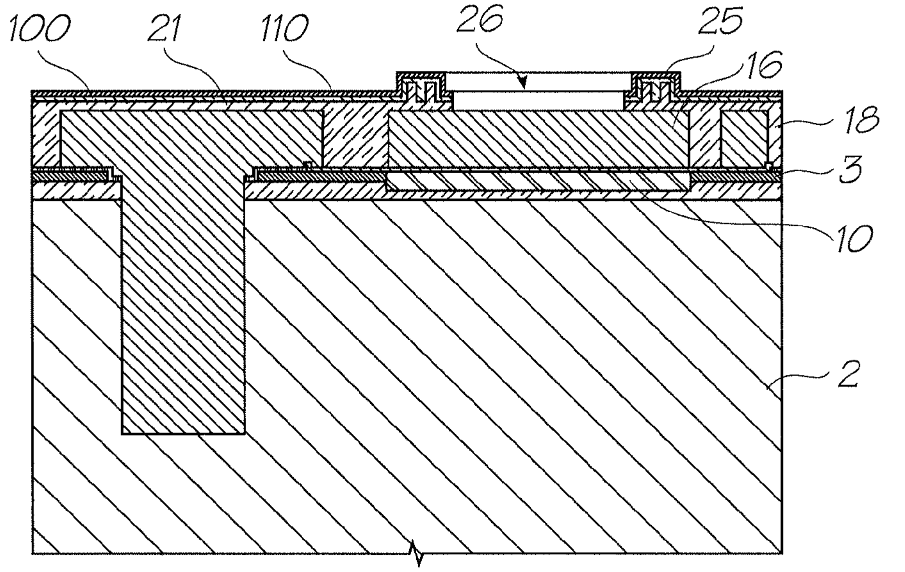
FIG. 40 shows the nozzle assembly of FIG. 39 after etching through the protective metal film, the polymeric coating and the nozzle roof.

FIG. 40 shows the wafer after etching the nozzle opening 26 through the metal film 110, the polymer layer and the nozzle roof 21. This etching step utilizes a conventional patterned photoresist layer (not shown) as a common mask for all nozzle etching steps. In a typical etching sequence, the metal film 110 is first etched, either by standard dry metal-etching (e.g. $BCl_3/Cl_2$) or wet metal-etching (e.g. $H_2O_2$ or HF). A second dry etch is then used to etch through the polymer layer 100 and the nozzle roof 21. Typically, the second etch step is a dry etch employing $O_2$ and a fluorinated etching gas (e.g. $SF_6$ or $CF_4$).

Once the nozzle opening 26 is defined as shown in FIG. 40, backside MEMS processing steps (e.g. etching ink supply channels, wafer thinning etc), late-stage ashing of photoresist and metal film 110 removal may be performed in the usual way.

Figure 39:
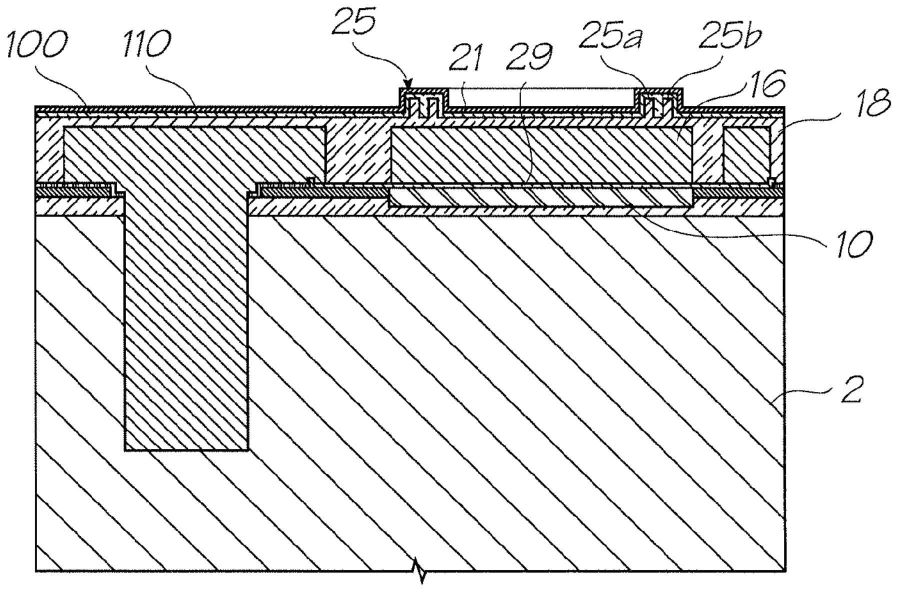
FIG. 39 shows the nozzle assembly of FIG. 23 after deposition of a protective metal film.

The sequence of steps shown in FIGS. 39 and 40 is advantageous, because final-stage ashing may be performed from a frontside of the wafer, once the nozzle opening 26 has been defined, which reduces ashing times. Furthermore, by etching through three layers using a common mask, the number of MEMS processing steps is significantly reduced.

Thermal Bend Actuator Printhead

Having discussed ways in which a nozzle surface of a printhead may be hydrophobized, it will be appreciated that any type of printhead may be hydrophobized in an analogous manner. However, the present invention realizes particular advantages in connection with the Applicant's previously described printhead comprising thermal bend actuator nozzle assemblies. Accordingly, a discussion of how the present invention may be used in such printheads now follows.

In a thermal bend actuated printhead, a nozzle assembly may comprise a nozzle chamber having a roof portion which moves relative to a floor portion of the chamber. The moveable roof portion is typically actuated to move towards the floor portion by means of a bi-layered thermal bend actuator. Such an actuator may be positioned externally of the nozzle chamber or it may define the moving part of the roof structure.

A moving roof is advantageous, because it lowers the drop ejection energy by only having one face of the moving structure doing work against the viscous ink. However, a problem with such moving roof structures is that it is necessary to seal the ink inside the nozzle chamber during actuation. Typically, the nozzle chamber relies on a fluidic seal, which forms a seal using the surface tension of the ink. However, such seals are imperfect and it would be desirable to form a mechanical seal which avoids relying on surface tension as a means for containing the ink. Such a mechanical seal would need to be sufficiently flexible to accommodate the bending motion of the roof.

A typical nozzle assembly 400 having a moving roof structure was described in our previously filed U.S. application Ser. No. 11/607,976 filed on Dec. 4, 2006 (the contents of which is herein incorporated by reference) and is shown here in FIGS. 27 to 30. The nozzle assembly 400 comprises a nozzle chamber 401 formed on a passivated CMOS layer 402 of a silicon substrate 403. The nozzle chamber is defined by a roof 404 and sidewalls 405 extending from the roof to the passivated CMOS layer 402. Ink is supplied to the nozzle chamber 401 by means of an ink inlet 406 in fluid communication with an ink supply channel 407 receiving ink from a backside of the silicon substrate. Ink is ejected from the nozzle chamber 401 by means of a nozzle opening 408 defined in the roof 404. The nozzle opening 408 is offset from the ink inlet 406.

Figure 27:
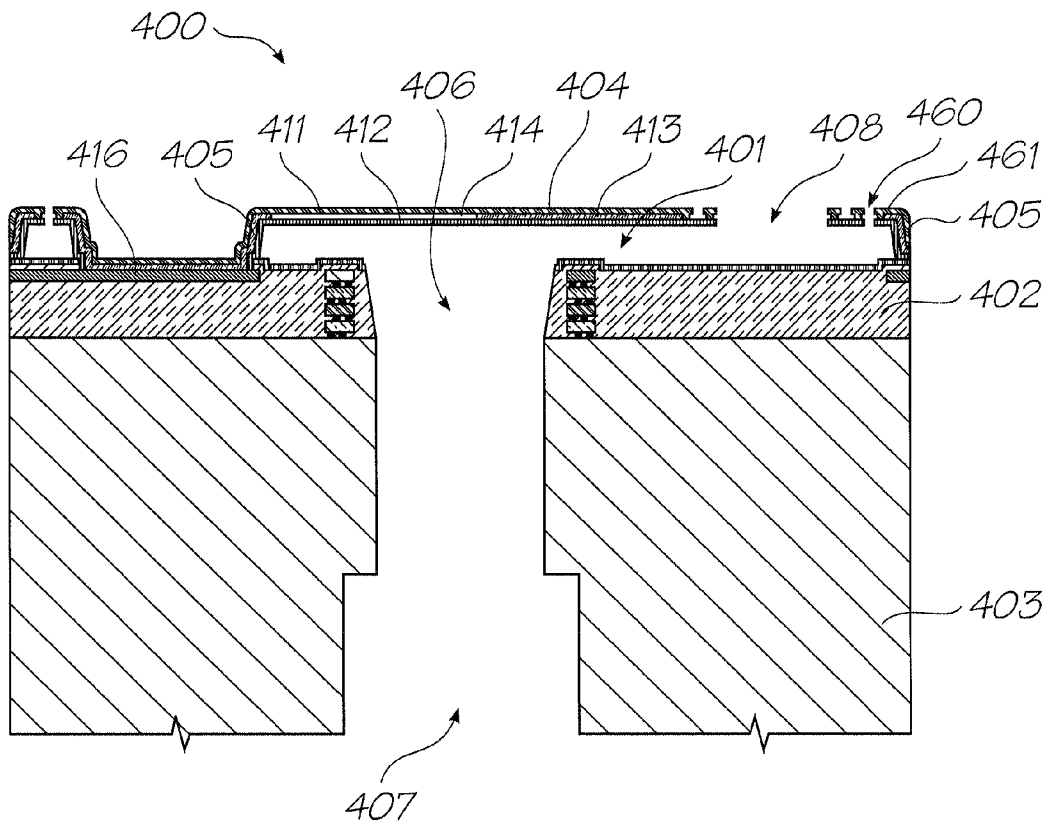
FIG. 27 is a side sectional view of an inkjet nozzle assembly comprising a roof having a moving portion defined by a thermal bend actuator.
Figure 28:
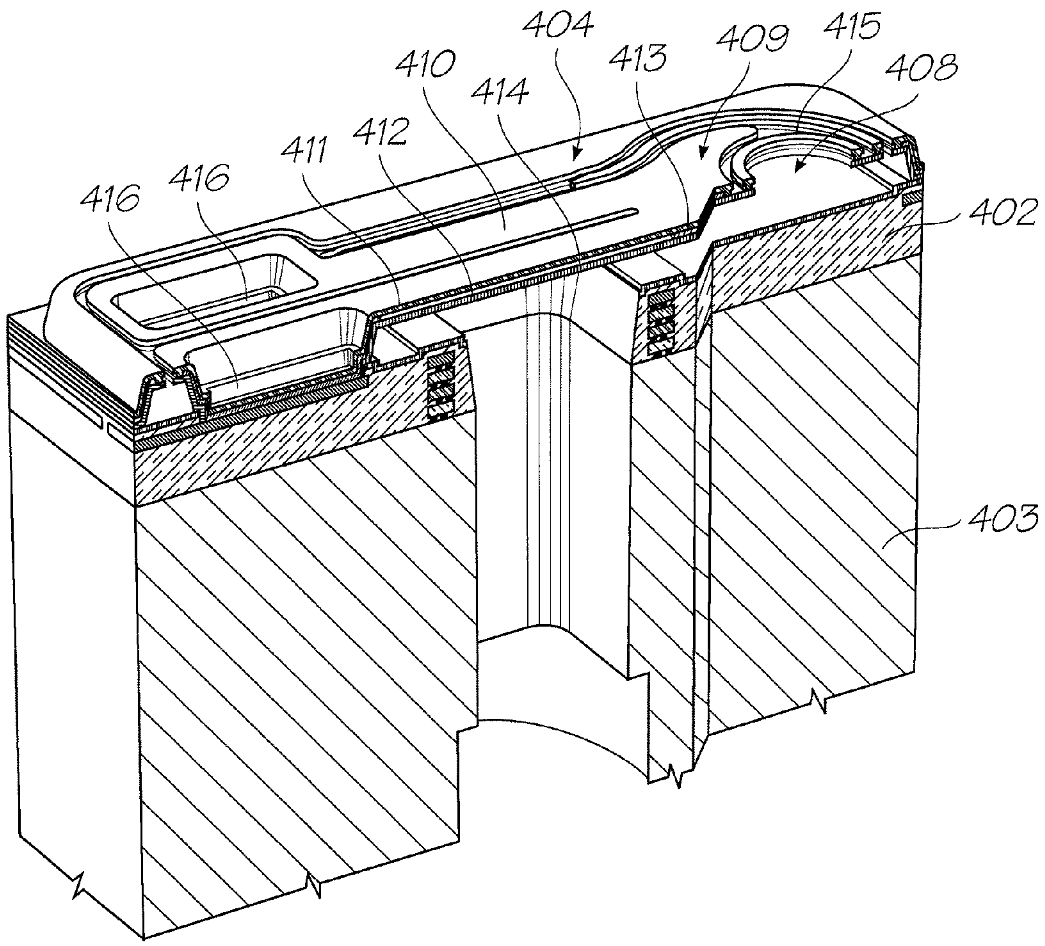
FIG. 28 is a cutaway perspective view of the nozzle assembly shown in FIG. 27.
Figure 29:
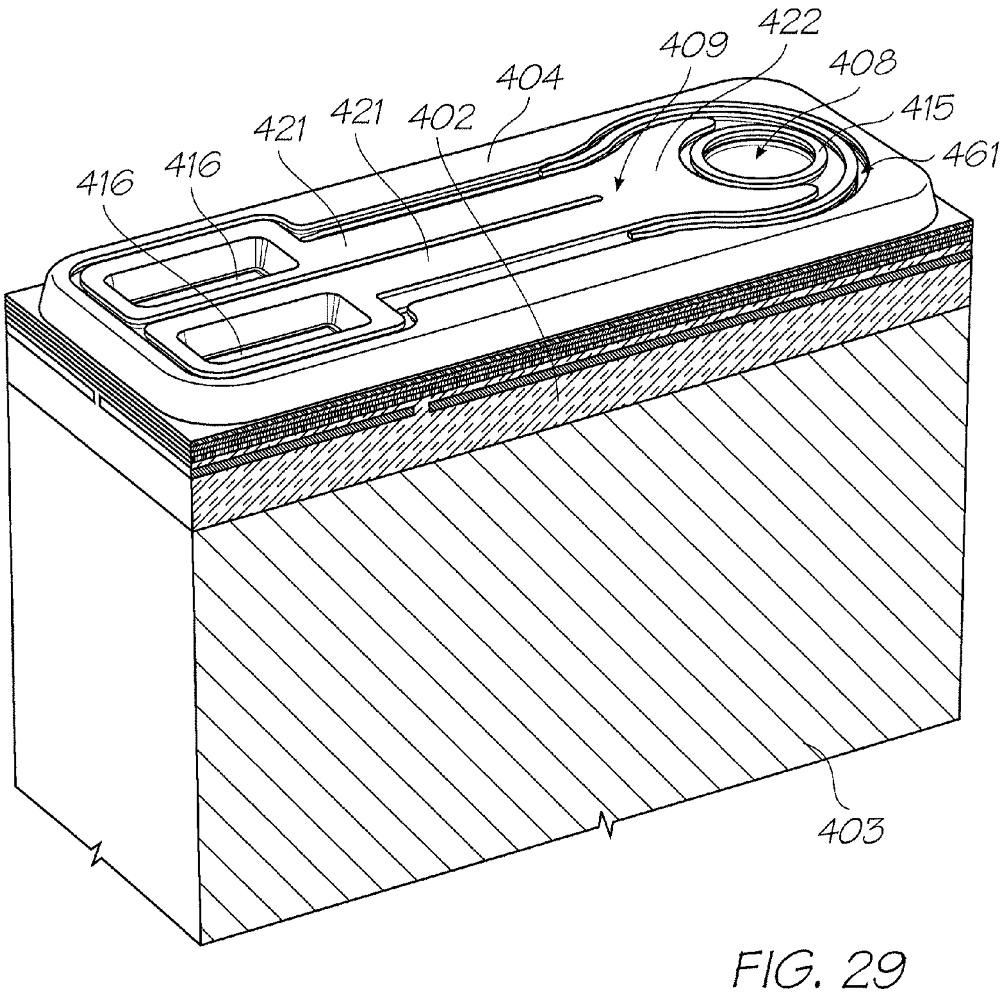
FIG. 29 is a perspective view of the nozzle assembly shown in FIG. 27.
Figure 30:
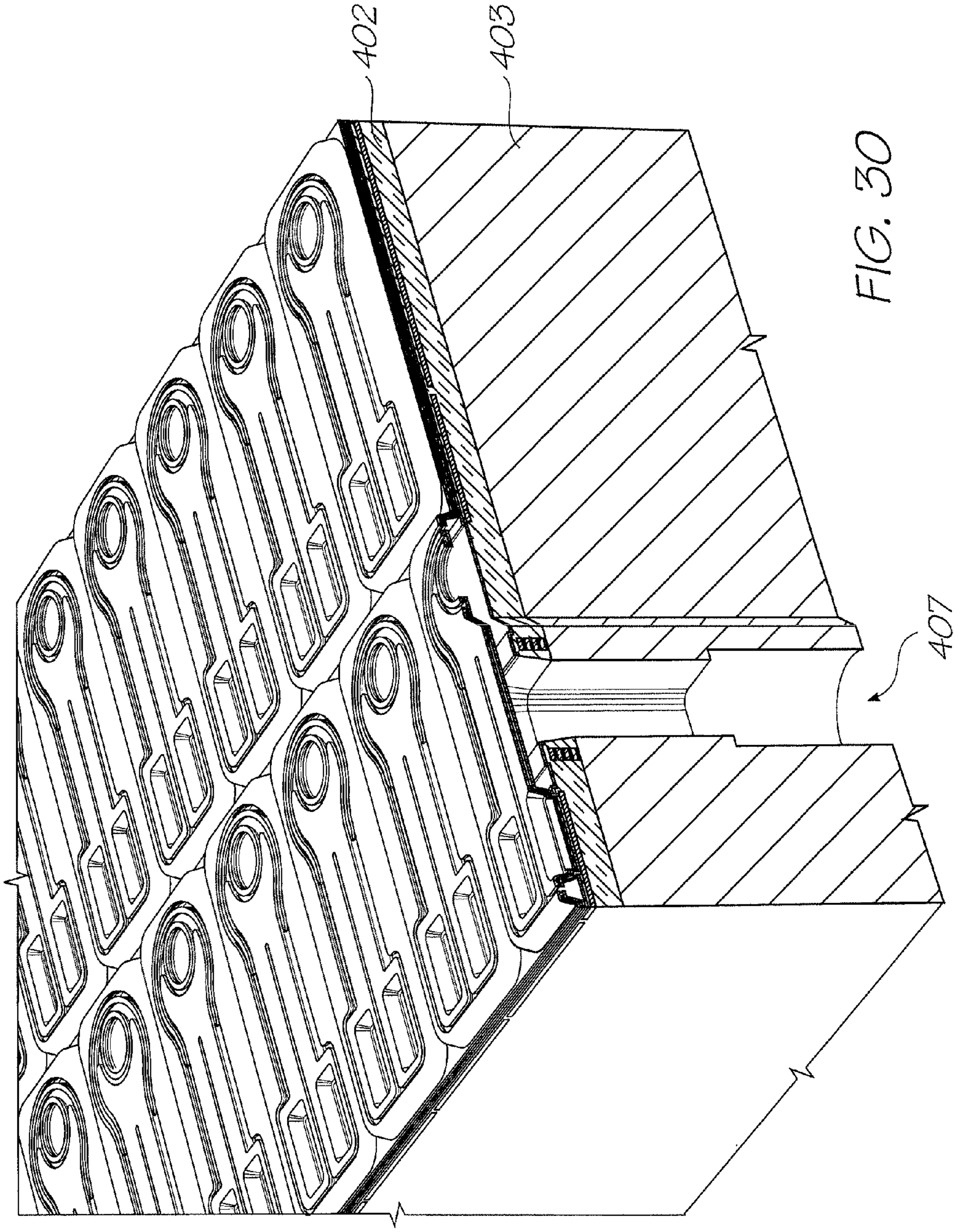
FIG. 30 is a cutaway perspective view of an array of the nozzle assemblies shown in FIG. 27.

As shown more clearly in FIG. 28, the roof 404 has a moving portion 409, which defines a substantial part of the total area of the roof. Typically, the moving portion 409 defines at least 50% of the total area of the roof 404. In the embodiment shown in FIGS. 27 to 30, the nozzle opening 408 and nozzle rim 415 are defined in the moving portion 409, such that the nozzle opening and nozzle rim move with the moving portion.

The nozzle assembly 400 is characterized in that the moving portion 409 is defined by a thermal bend actuator 410 having a planar upper active beam 411 and a planar lower passive beam 412. Hence, the actuator 410 typically defines at least 50% of the total area of the roof 404. Correspondingly, the upper active beam 411 typically defines at least 50% of the total area of the roof 404.

As shown in FIGS. 27 and 28, at least part of the upper active beam 411 is spaced apart from the lower passive beam 412 for maximizing thermal insulation of the two beams. More specifically, a layer of Ti is used as a bridging layer 413 between the upper active beam 411 comprised of TiN and the lower passive beam 412 comprised of $SiO_2$. The bridging layer 413 allows a gap 414 to be defined in the actuator 410 between the active and passive beams. This gap 414 improves the overall efficiency of the actuator 410 by minimizing thermal transfer from the active beam 411 to the passive beam 412.

However, it will of course be appreciated that the active beam 411 may, alternatively, be fused or bonded directly to the passive beam 412 for improved structural rigidity. Such design modifications would be well within the ambit of the skilled person.

The active beam 411 is connected to a pair of contacts 416 (positive and ground) via the Ti bridging layer. The contacts 416 connect with drive circuitry in the CMOS layers.

When it is required to eject a droplet of ink from the nozzle chamber 401, a current flows through the active beam 411 between the two contacts 416. The active beam 411 is rapidly heated by the current and expands relative to the passive beam 412, thereby causing the actuator 410 (which defines the moving portion 409 of the roof 404) to bend downwards towards the substrate 403. Since the gap 460 between the moving portion 409 and a static portion 461 is so small, surface tension can generally be relied up to seal this gap when the moving portion is actuated to move towards the substrate 403.

The movement of the actuator 410 causes ejection of ink from the nozzle opening 408 by a rapid increase of pressure inside the nozzle chamber 401. When current stops flowing, the moving portion 409 of the roof 404 is allowed to return to its quiescent position, which sucks ink from the inlet 406 into the nozzle chamber 401, in readiness for the next ejection.

Turning to FIG. 12, it will be readily appreciated that the nozzle assembly may be replicated into an array of nozzle assemblies to define a printhead or printhead integrated circuit. A printhead integrated circuit comprises a silicon substrate, an array of nozzle assemblies (typically arranged in rows) formed on the substrate, and drive circuitry for the nozzle assemblies. A plurality of printhead integrated circuits may be abutted or linked to form a pagewidth inkjet printhead, as described in, for example, Applicant's earlier U.S. application Ser. Nos. 10/854,491 filed on May 27, 2004 and 11/014,732 filed on Dec. 20, 2004, the contents of which are herein incorporated by reference.

Figure 32:
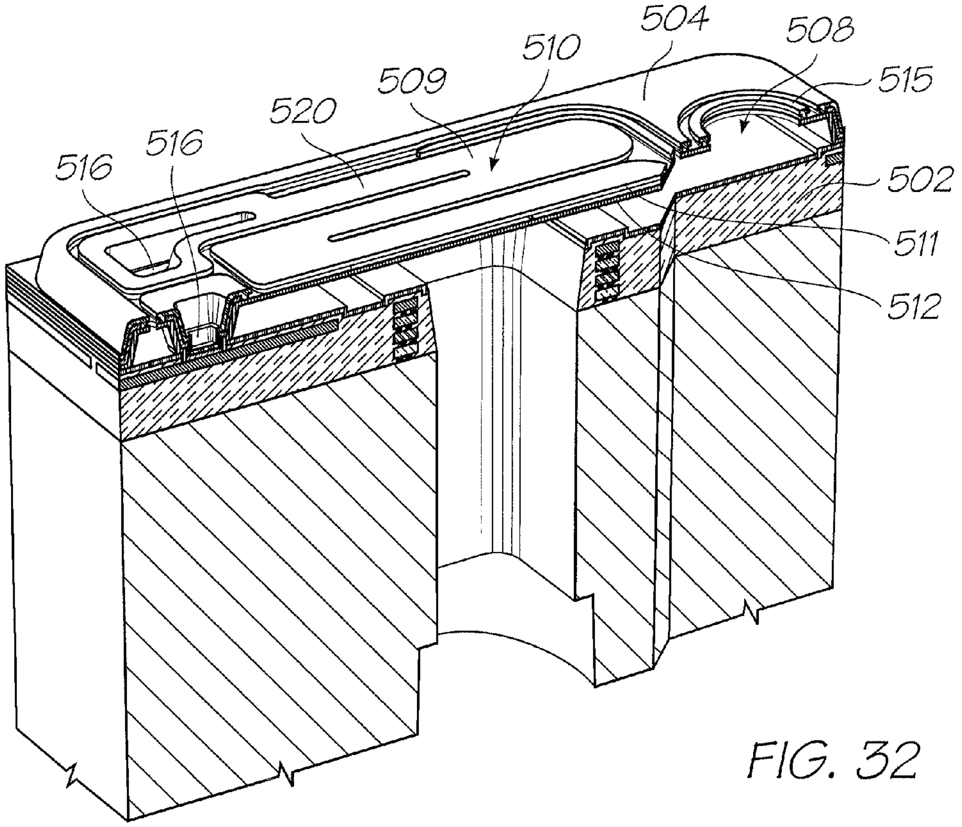
FIG. 32 is a cutaway perspective view of the nozzle assembly shown in FIG. 31.
Figure 31:
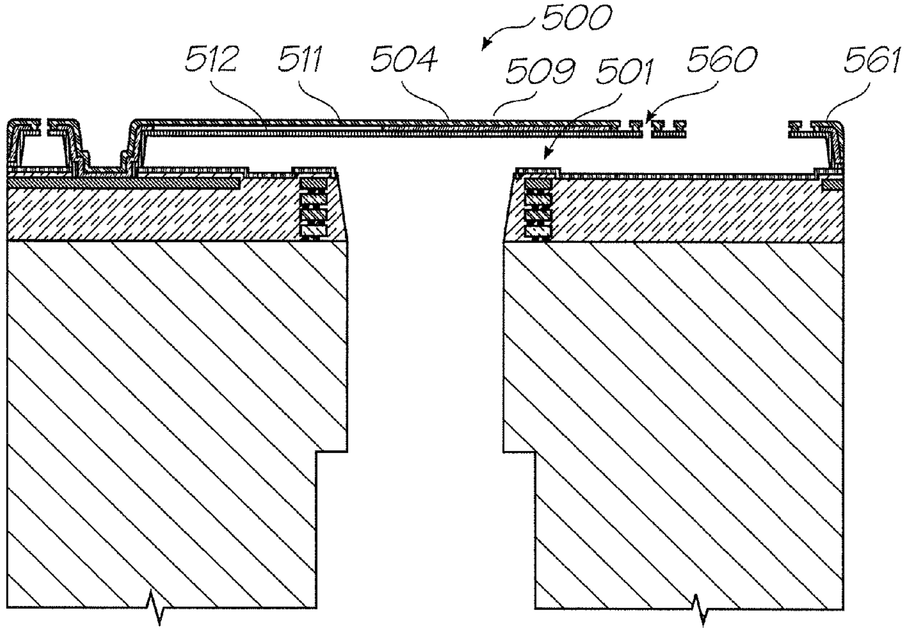
FIG. 31 is a side sectional view of an alternative inkjet nozzle assembly comprising a roof having a moving portion defined by a thermal bend actuator.
Figure 33:
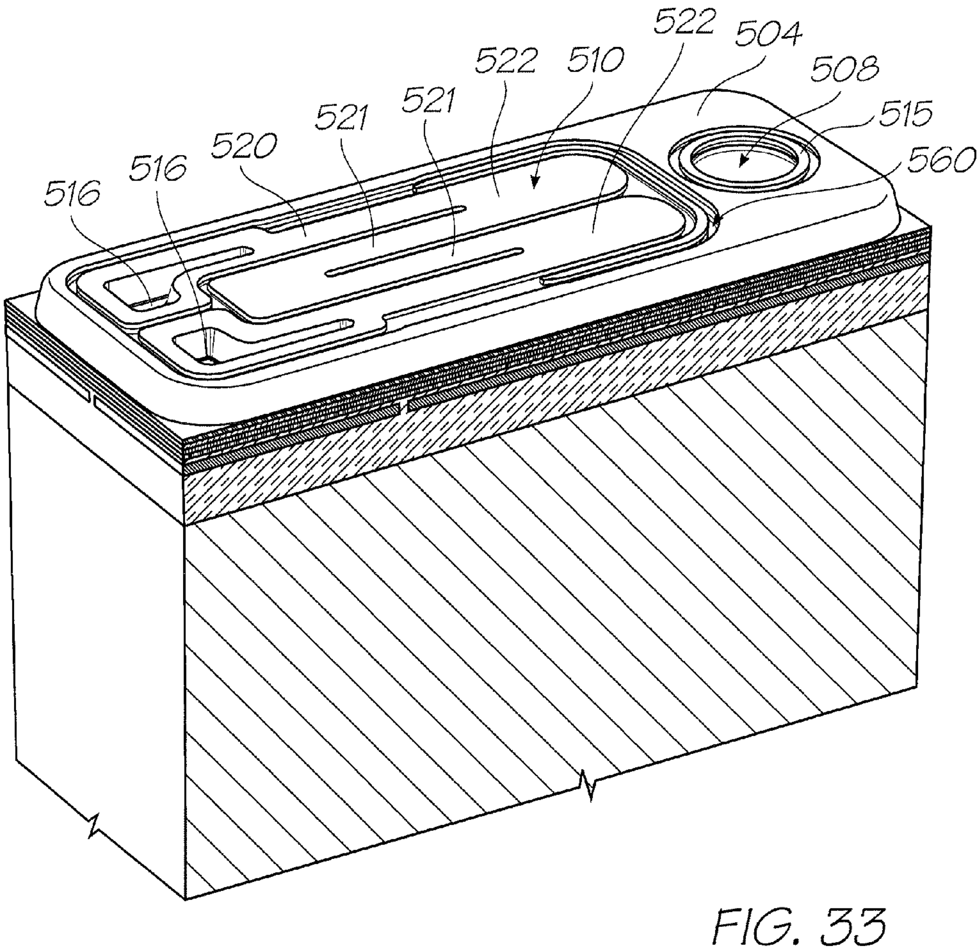
FIG. 33 is a perspective view of the nozzle assembly shown in FIG. 31.

An alternative nozzle assembly 500 shown in FIGS. 31 to 33 is similar to the nozzle assembly 400 insofar as a thermal bend actuator 510, having an upper active beam 511 and a lower passive beam 512, defines a moving portion of a roof 504 of the nozzle chamber 501.

However, in contrast with the nozzle assembly 400, the nozzle opening 508 and rim 515 are not defined by the moving portion of the roof 504. Rather, the nozzle opening 508 and rim 515 are defined in a fixed or static portion 561 of the roof 504 such that the actuator 510 moves independently of the nozzle opening and rim during droplet ejection. An advantage of this arrangement is that it provides more facile control of drop flight direction. Again, the small dimensions of the gap 560, between the moving portion 509 and the static portion 561, is relied up to create a fluidic seal during actuation by using the surface tension of the ink.

The nozzle assemblies 400 and 500, and corresponding printheads, may be constructed using suitable MEMS processes in an analogous manner to those described above. In all cases the roof of the nozzle chamber (moving or otherwise) is formed by deposition of a roof material onto a suitable sacrificial photoresist scaffold.

Figure 34:
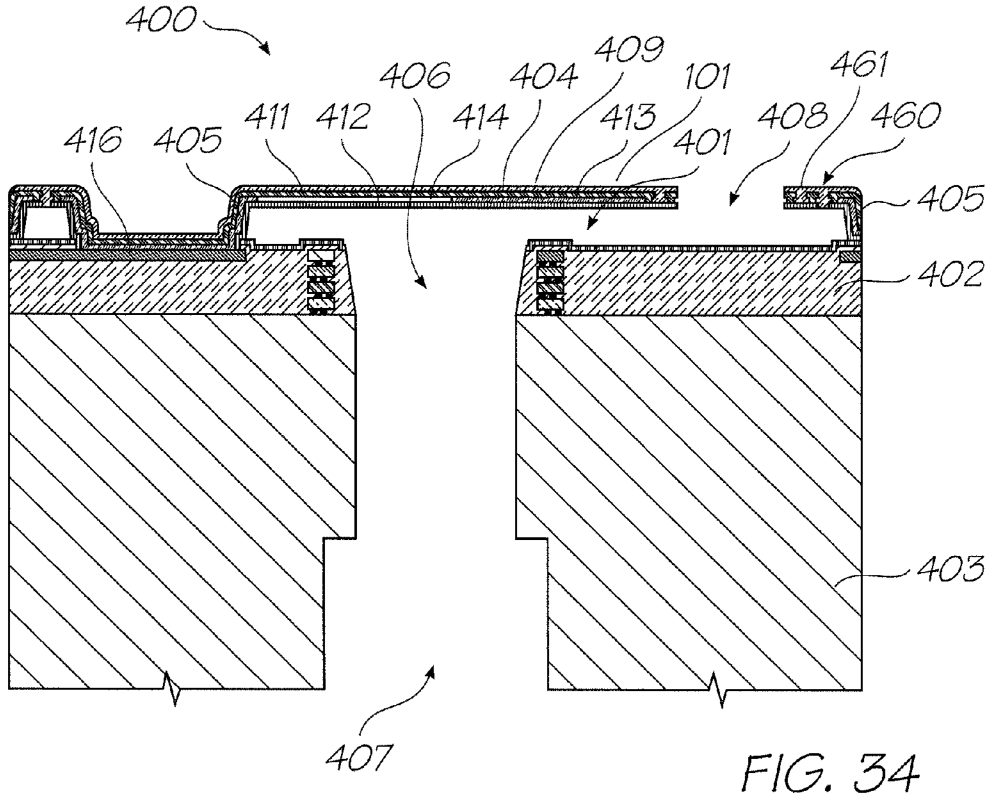
FIG. 34 shows the nozzle assembly of FIG. 27 with a polymeric coating on the roof forming a mechanical seal between a moving roof portion and a static roof portion.

Referring now to FIG. 34, it will be seen that the nozzle assembly 400 previously shown in FIG. 27 now has an additional layer of hydrophobic polymer 101 (as described in detail above) coated on the roof, including both the moving 409 and static portions 461 of the roof. Importantly, the hydrophobic polymer 101 seals the gap 460 shown in FIG. 27. It is an advantage of polymers such as PDMS and PFPE that they have extremely low stiffness. Typically, these materials have a Young's modulus of less than 1000 MPa and typically of the order of about 500 MPa. This characteristic is advantageous, because it enables them to form a mechanical seal in thermal bend actuator nozzles of the type described herein—the polymer stretches elastically during actuation, without significantly impeding the movement of the actuator. Indeed, an elastic seal assists in the bend actuator returning to its quiescent position, which is when drop ejection occurs. Moreover, with no gap between a moving roof portion 409 and a static roof portion 461, ink is fully sealed inside the nozzle chamber 401 and cannot escape, other than via the nozzle opening 408, during actuation.

Figure 35:
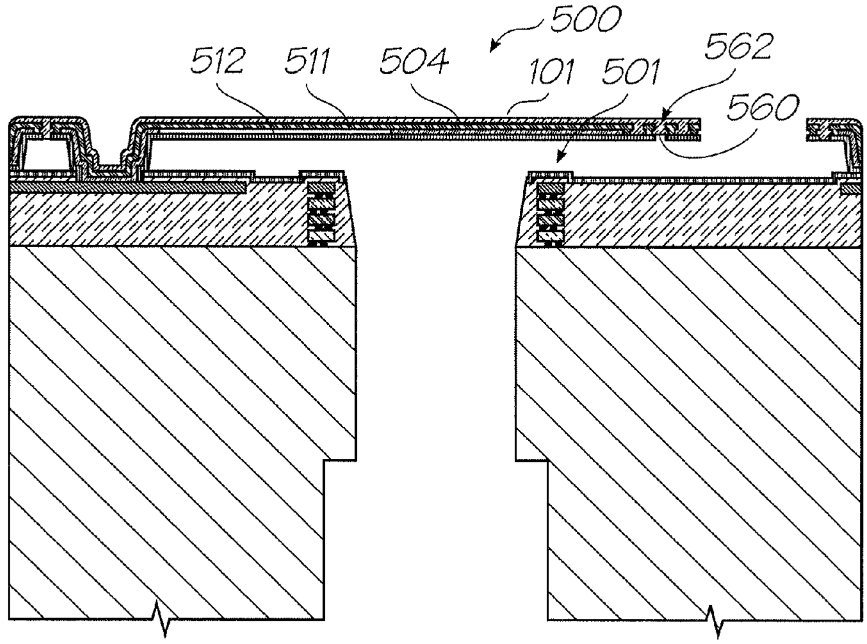
FIG. 35 shows the nozzle assembly of FIG. 31 with a polymeric coating on the roof forming a mechanical seal between a moving roof portion and a static roof portion.

FIG. 35 shows the nozzle assembly 500 with a hydrophobic polymer coating 101. By analogy with the nozzle assembly 400, it will be appreciated that by sealing the gap 560 with the polymer 101, a mechanical seal 562 is formed which provides excellent mechanical sealing of ink in the nozzle chamber 501.

It will be appreciated by ordinary workers in this field that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method of fabricating a printhead having a hydrophobic ink ejection face, the method comprising the steps of:

(a) providing a partially-fabricated printhead comprising a plurality of nozzle chambers filled with a first sacrificial material and a nozzle plate having a relatively hydrophilic nozzle surface, said nozzle surface at least partially defining the ink ejection face of the printhead;

(b) depositing a hydrophobic polymeric layer onto the nozzle surface;

(c) depositing a protective metal film onto at least said hydrophobic polymeric layer;

(d) depositing a second sacrificial material onto said metal film;

(e) patterning said sacrificial material to define a plurality of nozzle opening regions;

(f) defining a plurality of nozzle openings through said metal film, said hydrophobic polymeric layer and said nozzle plate;

(g) removing all of said first sacrificial material by subjecting said printhead to an oxidizing plasma, wherein said metal film protects said hydrophobic polymeric layer from said oxidizing plasma; and (h) removing said protective metal film after removal of said first sacrificial material, thereby providing a printhead having a relatively hydrophobic ink ejection face.

2. The method of claim 1, wherein said protective metal film is comprised of a metal selected from the group comprising: titanium and aluminium.

3. The method of claim 1, wherein said protective metal film has a thickness in the range of 10 nm to 1000 nm.

4. The method of claim 1, wherein step (f) is performed by sequential etching steps.

5. The method of claim 4, wherein a first metal-etching step is followed immediately by a second etching step for removing polymeric material and nozzle plate material.

6. The method of claim 5, wherein said second etching step is a dry etch employing a gas chemistry comprising $O_2$ and a fluorinated etching gas.

7. The method of claim 6, wherein said fluorinated etching gas is selected from the group comprising: $CF_4$ and $SF_6$.

8. The method of claim 1, wherein step (h) is performed by wet or dry etching.

9. The method of claim 1, wherein step (h) is performed by a wet rinse using peroxide or HF.

10. The method of claim 1, wherein all plasma oxidizing steps are performed prior to removing said protective metal film in step (h).

11. The method of claim 1, wherein backside MEMS processing steps are performed prior to removing said protective metal film in step (h).

12. The method of claim 11, wherein said backside MEMS processing steps include defining ink supply channels from a backside of said wafer, said backside being an opposite face to said ink ejection face.

13. The method of claim 1, wherein said first sacrificial material is a photoresist scaffold which is removed using an oxygen ashing plasma.

14. The method of claim 1, wherein a roof of each nozzle chamber is defined at least partially by said nozzle plate.

15. The method of claim 14, wherein said nozzle plate is spaced apart from a substrate, such that sidewalls of each nozzle chamber extend between said nozzle plate and said substrate.

16. The method of claim 1, wherein said hydrophobic polymeric layer is comprised of a polymeric material selected from the group consisting of: polymerized siloxanes.

17. The method of claim 16, wherein said polymeric material is polydimethylsiloxane (PDMS).

18. The method of claim 1, wherein said nozzle plate is comprised of a material selected from the group consisting of: silicon nitride; silicon oxide and silicon oxynitride.

19. The method of claim 1, wherein at least one of said first and second sacrificial materials is photoresist.

* * * * *